(12) United States Patent
Przybylski et al.

(10) Patent No.: US 11,408,626 B2
(45) Date of Patent: Aug. 9, 2022

(54) CENTRAL PLANT CONTROL SYSTEM WITH DYNAMIC COMPUTATION REDUCTION

(71) Applicant: Johnson Controls Technology Company, Auburn Hills, MI (US)

(72) Inventors: Andrew J. Przybylski, Franksville, WI (US); Graeme Willmott, West Milwaukee, WI (US); John H. Burroughs, Wauwatosa, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 83 days.

(21) Appl. No.: 16/737,579

(22) Filed: Jan. 8, 2020

(65) Prior Publication Data

US 2020/0224909 A1 Jul. 16, 2020

Related U.S. Application Data

(60) Provisional application No. 62/791,653, filed on Jan. 11, 2019.

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/64* (2018.01); *F24F 11/65* (2018.01); *G05B 15/02* (2013.01);
(Continued)

(58) Field of Classification Search
CPC .. F24F 11/46; F24F 11/64; F24F 11/65; F24F 2140/60; F24F 2140/50; G05B 15/02; G05B 2219/2614; H04L 12/2827
See application file for complete search history.

(56) References Cited

U.S. PATENT DOCUMENTS 10,101,731 B2 10/2018 Asmus et al.
10,175,681 B2 1/2019 Wenzel et al.
(Continued)

FOREIGN PATENT DOCUMENTS

EP 3 434 996 A1 1/2019

OTHER PUBLICATIONS

Office Action for European Application No. EP 20151204.3 dated Jun. 9, 2020, 10 pages.
(Continued)

*Primary Examiner* — M. N. Von Buhr
(74) *Attorney, Agent, or Firm* — Foley & Lardner LLP

(57) ABSTRACT

A controller for a plurality of heating, ventilation, or air conditioning (HVAC) devices includes a processing circuit that includes one or more processors and memory. The controller detects a change in condition that affects an operating status of a first HVAC device of the plurality of HVAC devices. The controller uses schematic relationships between the plurality of HVAC devices to determine a reduced subset of the plurality of HVAC devices for which operating parameters are to be generated based on the operating status of the first HVAC device. The controller generates operating parameters for the reduced subset of the plurality of HVAC devices and operates the plurality of HVAC devices using the operating parameters.

20 Claims, 18 Drawing Sheets

(51) Int. Cl.
  *F24F 11/65*   (2018.01)
  *G05B 15/02*   (2006.01)
  *F24F 140/60*  (2018.01)
  *F24F 140/50*  (2018.01)
  *H04L 12/28*   (2006.01)

(52) U.S. Cl.
  CPC ....... *F24F 2140/50* (2018.01); *F24F 2140/60* (2018.01); *G05B 2219/2614* (2013.01); *H04L 12/2827* (2013.01)

(56) References Cited

U.S. PATENT DOCUMENTS

| | | | | |
|---|---|---|---|---|
| 10,216,158 | B2* | 2/2019 | Wacker | G05B 15/02 |
| 10,429,808 | B2* | 10/2019 | Sanghamitra | G05B 15/02 |
| 10,437,207 | B2* | 10/2019 | Wacker | F24F 11/30 |
| 10,514,178 | B2 | 12/2019 | Willmott et al. | |
| 10,558,178 | B2* | 2/2020 | Willmott | G05B 13/026 |
| 10,558,182 | B2* | 2/2020 | Wacker | F24F 11/30 |
| 10,663,934 | B2* | 5/2020 | Sanghamitra | F24F 11/62 |
| 10,809,705 | B2* | 10/2020 | Przybylski | G05B 19/41885 |
| 10,969,135 | B2* | 4/2021 | Willmott | G05B 13/041 |
| 2002/0147764 | A1* | 10/2002 | Krupczak | H04L 41/046 709/202 |
| 2011/0126144 | A1* | 5/2011 | Sakaguchi | F24F 11/30 715/771 |
| 2015/0007596 | A1* | 1/2015 | Bean, Jr. | H05K 7/20827 62/115 |
| 2015/0009626 | A1* | 1/2015 | Lan | H05K 7/20154 361/696 |
| 2015/0192940 | A1* | 7/2015 | Silva | H04N 5/765 700/276 |
| 2016/0313752 | A1 | 10/2016 | Przybylski | |
| 2017/0205096 | A1 | 7/2017 | Wacker | |
| 2018/0180315 | A1* | 6/2018 | Hoglund | F24F 11/30 |
| 2018/0217621 | A1* | 8/2018 | Biesterveld | G05D 23/1934 |
| 2018/0284819 | A1* | 10/2018 | McDaniel | F24F 11/64 |
| 2019/0032942 | A1 | 1/2019 | Willmott et al. | |
| 2019/0032947 | A1 | 1/2019 | Willmott et al. | |
| 2019/0032949 | A1 | 1/2019 | Willmott et al. | |
| 2019/0072943 | A1 | 3/2019 | Przybylski | |
| 2019/0309975 | A1* | 10/2019 | Salem | F24F 11/72 |
| 2020/0358630 | A1* | 11/2020 | Deligio | H04L 12/2816 |
| 2021/0072776 | A1* | 3/2021 | Honda | F24F 11/56 |

OTHER PUBLICATIONS

Office Action for European Application No. EP 20151204.3 dated Jul. 22, 2021, 12 pages.

* cited by examiner

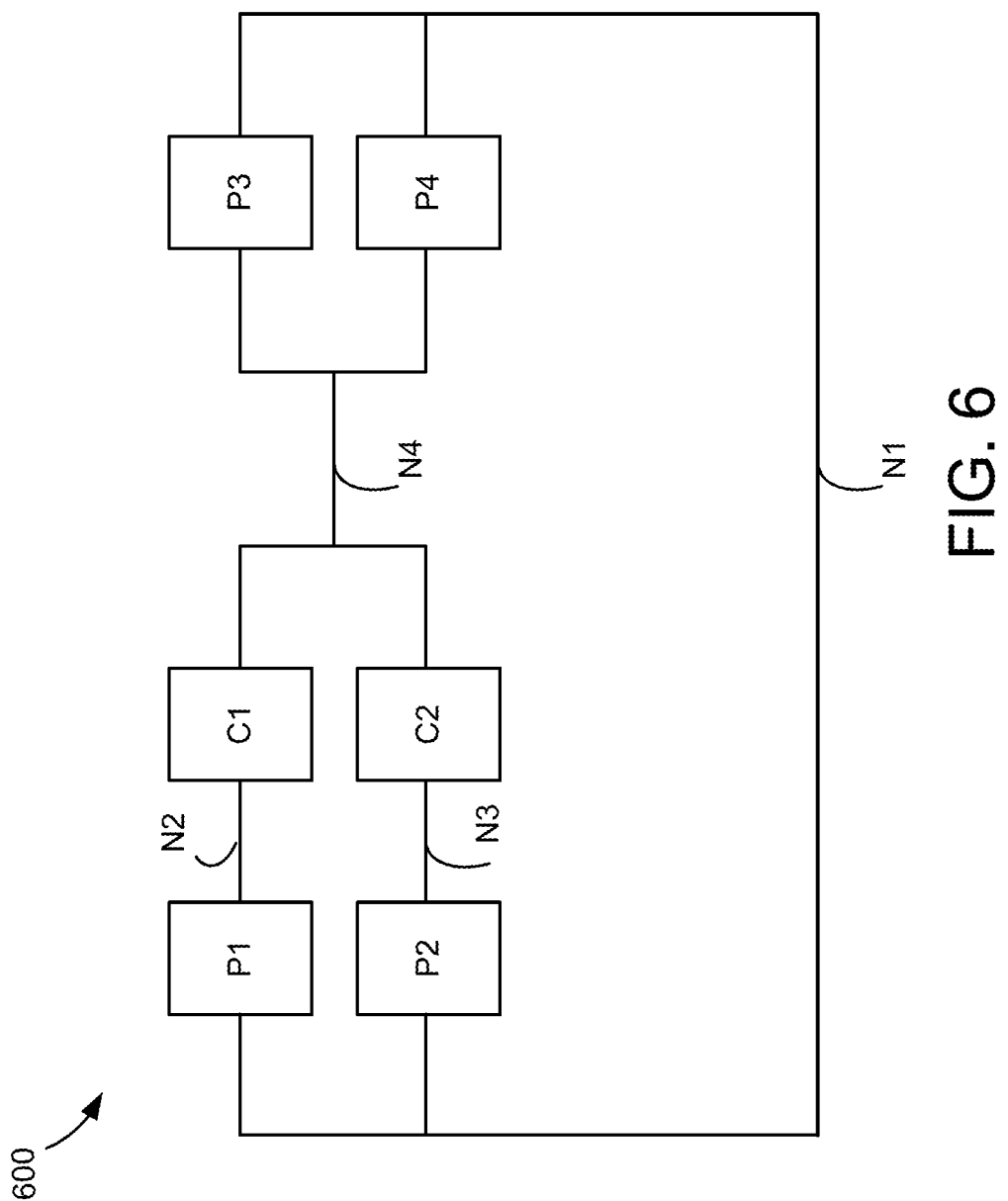

800A

| Devices | | | Nodes | | | | |
|---|---|---|---|---|---|---|---|
| Device Type | Device Name | Device Number | 1 | 2 | 3 | 4 | 5 |
| Chiller | C1 | 1 | 0 | -1 | 0 | 1 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | -1 | 1 | 0 | 0 | 0 |
| Pump | P2 | 7 | -1 | 0 | 1 | 0 | 0 |
| Pump | P3 | 8 | 0 | 0 | 0 | -1 | 1 |

| Devices | | | Nodes | | | | |
|---|---|---|---|---|---|---|---|
| Device Type | Device Name | Device Number | 1 | 2 | 3 | 4 | 5 |
| Chiller | C1 | 1 | 0 | 0 | 0 | 0 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | -1 | 1 | 0 | 0 | 0 |
| Pump | P2 | 7 | -1 | 0 | 1 | 0 | 0 |
| Pump | P3 | 8 | 0 | 0 | 0 | -1 | 1 |

| Devices | | | Nodes | | | | |
|---|---|---|---|---|---|---|---|
| Device Type | Device Name | Device Number | 1 | 2 | 3 | 4 | 5 |
| Chiller | C1 | 1 | 0 | 0 | 0 | 0 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | 0 | 0 | 0 | 0 | 0 |
| Pump | P2 | 7 | -1 | 0 | 1 | 0 | 0 |
| Pump | P3 | 8 | 0 | 0 | 0 | -1 | 1 |

CENTRAL PLANT CONTROL SYSTEM WITH DYNAMIC COMPUTATION REDUCTION

CROSS-REFERENCE TO RELATED PATENT APPLICATION

This application claims the benefit of and priority to U.S. Provisional Patent Application No. 62/791,653 filed Jan. 11, 2019, the entire disclosure of which is incorporated by reference herein.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

Controlling the central plant includes determining a set of operating parameters of the HVAC devices. In particular, some HVAC device operates according to a selected operating parameter from a range of operating parameters. Examples of the operating parameters include operating capacity (e.g., 50% capacity) of corresponding HVAC devices. Determining a set of operating parameters includes, for a candidate set of operating parameters, predicting thermodynamic states (e.g., pressure values, temperatures values, mass flow values, etc.) of different HVAC devices in operation together, and predicting power consumption of the central plant based on the predicted thermodynamic states. By comparing power consumptions of different candidate sets of operating parameters, a candidate set with the lowest power consumption may be determined as the set of operating parameters.

One conventional approach of predicting thermodynamic states of a central plant for a candidate set of operating parameters includes computing the full thermodynamic states by a non-linear solver. However, predicting thermodynamic states of the central plant in a complex arrangement by the non-linear solver is inefficient in terms of computational resources (e.g., processor usage and memory used). Furthermore, predicting thermodynamic states for multiple sets of operating parameters, and comparing power consumptions for multiple sets of operating parameters to determine a set of thermodynamic states rendering lower power consumption through a conventional approach are inefficient and computationally exhaustive.

SUMMARY

One implementation of the present disclosure is a controller for a plurality of heating, ventilation, or air conditioning (HVAC) devices. The controller includes a processing circuit that includes one or more processors and memory. The memory stores instructions that, when executed by the one or more processors, cause the one or more processors to detect a change in condition that affects an operating status of a first HVAC device of the plurality of HVAC devices. The instructions further cause the processors to use schematic relationships between the plurality of HVAC devices to determine a reduced subset of the plurality of HVAC devices for which operating parameters are to be generated based on the operating status of the first HVAC device. The instructions further cause the processors to generate operating parameters for the reduced subset of the plurality of HVAC devices. The instructions further cause the processors to operate the plurality of HVAC devices using the operating parameters.

In some embodiments, using the schematic relationships between the plurality of HVAC devices to determine the reduced subset of the plurality of HVAC devices includes identifying a second HVAC device of the plurality of HVAC devices that is schematically dependent on the first HVAC device based on the schematic relationships and excluding the second HVAC device from the reduced subset of the plurality of HVAC devices.

In some embodiments, using the schematic relationships between the plurality of HVAC devices to determine the reduced subset of the plurality of HVAC devices includes identifying a second HVAC device of the plurality of HVAC devices that is arranged in series with the first HVAC device based on the schematic relationships and excluding the second HVAC device from the reduced subset of the plurality of HVAC devices in response to the change in condition causing the first HVAC device to become inactive.

In some embodiments, using the schematic relationships between the plurality of HVAC devices to determine the reduced subset of the plurality of HVAC devices includes identifying a second HVAC device of the plurality of HVAC devices that is arranged in parallel with the first HVAC device based on the schematic relationships and setting an operating status of the second HVAC device to provide a flow path through the second HVAC device in response to the change in condition causing a flow path through the first HVAC device to become closed.

In some embodiments, using the schematic relationships between the plurality of HVAC devices to determine the reduced subset of the plurality of HVAC devices includes determining that the first HVAC device is a linking device that couples a first group of the plurality of HVAC devices with a second group of the plurality of HVAC devices based on the schematic relationships and excluding the second group of the plurality of HVAC devices from the reduced subset of the plurality of HVAC devices in response to the change in condition causing the first HVAC device to decouple the first group from the second group.

In some embodiments, using the schematic relationships between the plurality of HVAC devices to determine the reduced subset of the plurality of HVAC devices includes identifying a stranded node coupled to the first HVAC device in response to the change in condition causing the operating status of the first HVAC device to become inactive. Using the schematic relationships further includes using the schematic relationships to identify a second HVAC device of the plurality of HVAC devices coupled to the stranded node and excluding the second HVAC device from the reduced subset of the plurality of HVAC devices.

Another implementation of the present disclosure is a controller for a plurality of heating, ventilation, or air conditioning (HVAC) devices. The controller includes a processing circuit that includes one or more processors and memory. The memory storing instructions that, when executed by the one or more processors, cause the one or more processors to detect a change in condition that affects an operating status of a first HVAC device of the plurality of HVAC devices. The instructions further cause the processor to determine a reduced subset of the plurality of HVAC devices for which operating parameters are to be generated based on the change in condition. The instructions further cause the processor to generate operating parameters for the reduced subset of the plurality of HVAC devices and operate the plurality of HVAC devices using the operating parameters.

In some embodiments, the change in condition is a change in a monitored variable that causes the operating status of the first HVAC device to become inactive and determining the reduced subset of the plurality of HVAC devices includes excluding the first HVAC device from the reduced subset of the plurality of HVAC devices.

In some embodiments, determining the reduced subset of the plurality of HVAC devices for which operating parameters are to be generated includes using a stored rule to evaluate the change in condition and set the operating status of the first HVAC device to an operating status defined by the stored rule. Determining the reduced subset further includes excluding the first HVAC device from the reduced subset of the plurality of HVAC devices in response to setting the operating status of the first HVAC device to the operating status defined by the stored rule.

In some embodiments, the change in condition is an indication that a sensor is offline or that measurements from the sensor are unreliable. In some embodiments, determining the reduced subset of the plurality of HVAC devices includes disabling the first HVAC device and excluding the first HVAC device from the reduced subset of the plurality of HVAC devices in response to determining that operating the first HVAC device relies upon the measurements from the sensor.

In some embodiments, detecting the change in condition includes determining a time at which the operating status of the first HVAC device most recently changed. In some embodiments, determining the reduced subset of the plurality of HVAC devices includes excluding the first HVAC device from the reduced subset of the plurality of HVAC devices in response to determining that a threshold amount of time has not yet elapsed since the time at which the operating status of the first HVAC device most recently changed.

In some embodiments, determining the reduced subset of the plurality of HVAC devices includes using schematic relationships between the plurality of HVAC devices to identify a second HVAC device that is schematically dependent on the first HVAC device and excluding the second HVAC device from the reduced subset of the plurality of HVAC devices.

In some embodiments, determining the reduced subset of the plurality of HVAC devices includes identifying a stranded node coupled to the first HVAC device in response to the change in condition causing the operating status of the first HVAC device to become inactive, using schematic relationships between the plurality of HVAC devices to identify a second HVAC device of the plurality of HVAC devices coupled to the stranded node, and excluding the second HVAC device from the reduced subset of the plurality of HVAC devices.

Another implementation of the present disclosure is a method for operating a plurality of heating, ventilation, or air conditioning (HVAC) devices. The method includes detecting a change in condition that affects an operating status of a first HVAC device of the plurality of HVAC devices. The method further includes using schematic relationships between the plurality of HVAC devices to determine a reduced subset of the plurality of HVAC devices for which operating parameters are to be generated based on the operating status of the first HVAC device. The method further includes generating operating parameters for the reduced subset of the plurality of HVAC devices. The method further includes operating the plurality of HVAC devices using the operating parameters.

In some embodiments, using the schematic relationships between the plurality of HVAC devices to determine the reduced subset of the plurality of HVAC devices includes identifying a second HVAC device of the plurality of HVAC devices that is schematically dependent on the first HVAC device based on the schematic relationships and excluding the second HVAC device from the reduced subset of the plurality of HVAC devices.

In some embodiments, using the schematic relationships between the plurality of HVAC devices to determine the reduced subset of the plurality of HVAC devices includes identifying a second HVAC device of the plurality of HVAC devices that is arranged in series with the first HVAC device based on the schematic relationships and excluding the second HVAC device from the reduced subset of the plurality of HVAC devices in response to the change in condition causing the first HVAC device to become inactive.

In some embodiments, using the schematic relationships between the plurality of HVAC devices to determine the reduced subset of the plurality of HVAC devices includes identifying a second HVAC device of the plurality of HVAC devices that is arranged in parallel with the first HVAC device based on the schematic relationships and setting an operating status of the second HVAC device to provide a flow path through the second HVAC device in response to the change in condition causing a flow path through the first HVAC device to become closed.

In some embodiments, using the schematic relationships between the plurality of HVAC devices to determine the reduced subset of the plurality of HVAC devices includes determining that the first HVAC device is a linking device that couples a first group of the plurality of HVAC devices with a second group of the plurality of HVAC devices based on the schematic relationships and excluding the second group of the plurality of HVAC devices from the reduced subset of the plurality of HVAC devices in response to the change in condition causing the first HVAC device to decouple the first group from the second group.

In some embodiments, using the schematic relationships between the plurality of HVAC devices to determine the reduced subset of the plurality of HVAC devices includes identifying a stranded node coupled to the first HVAC device in response to the change in condition causing the operating status of the first HVAC device to become inactive, using the schematic relationships to identify a second HVAC device of the plurality of HVAC devices coupled to the stranded node, and excluding the second HVAC device from the reduced subset of the plurality of HVAC devices.

In some embodiments, the change in condition is a change in a monitored variable that causes the operating status of the first HVAC device to become inactive and determining the reduced subset of the plurality of HVAC devices includes excluding the first HVAC device from the reduced subset of the plurality of HVAC devices.

BRIEF DESCRIPTION OF THE DRAWINGS

FIG. 6 illustrates an example schematic representation of a HVAC system, according to some embodiments.

FIG. 8A is an example incidence matrix of the HVAC system representing schematic connections of the HVAC system of FIG. 7A, according to some embodiments.

FIG. 8B is an example incidence matrix of the HVAC system representing schematic connections of the HVAC system of FIG. 7B, according to some embodiments.

FIG. 8C is an example incidence matrix of the HVAC system representing schematic connections of the HVAC system of FIG. 7C, according to some embodiments.

DETAILED DESCRIPTION

Overview

Referring generally to the FIGURES, disclosed herein are systems and methods for determining a set of operating parameters for operating a HVAC system through disclosed dynamic computation reduction.

In some embodiments, a central plant controller disclosed herein dynamically performs computation reduction for operating the HVAC system. In one approach, the central plant controller obtains an incidence matrix based on connections of HVAC devices of the HVAC system. An incidence matrix is a matrix indicating schematic connections of HVAC devices of the HVAC system. The central plant controller may detect a change in condition of a HVAC device of the HVAC devices, and determine a modified subset of the HVAC devices based on the incidence matrix according to the changed condition of the HVAC device. Examples of the changed condition of the HVAC device include change in internal or external characteristic (e.g., temperature, pressure, flow rate, etc.) of the HVAC device. In one approach, the central plant controller obtains a reduced number of HVAC devices from all or a subset of the HVAC devices based on the incidence matrix according to the changed condition of the HVAC device, and determines a set of operating parameters of the reduced number of HVAC devices.

Beneficially, the central plant controller improves an operation efficiency of the HVAC system by dynamically reducing computation resource for determining operating parameters of the HVAC system. In one aspect, the central plant controller detects a change in condition of a HVAC device, and automatically determines one or more HVAC devices schematically dependent on the HVAC device. The central plant controller may dynamically modify a number of operating parameters of HVAC devices to be determined, according to the changed condition of the HVAC device and schematic dependencies of other HVAC devices. As a result, the HVAC system may omit or isolate determining operating parameters of inoperable HVAC devices that are schematically independent from operable HVAC devices. Inoperable HVAC devices may be disabled or turned off, and operable HVAC devices may be enabled or turned on during operation. Hence, the central plant controller may identify operating parameters rendering an improved performance of the HVAC system in a computationally efficient manner, and operate the HVAC system according to the determined operating parameters.

Building and HVAC System

Figure 1:
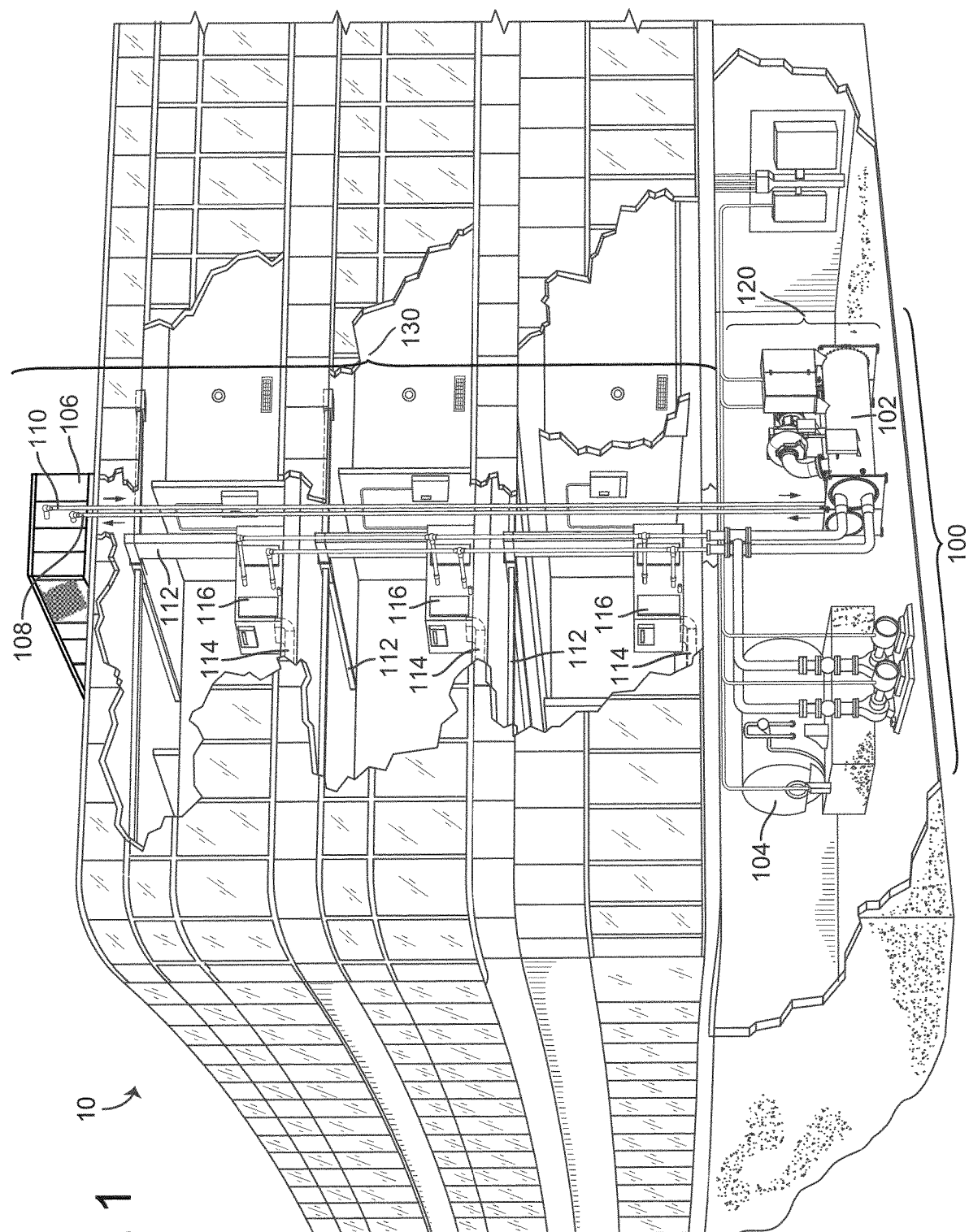
FIG. 1 is a drawing of a building equipped with a HVAC system, according to some embodiments.
Figure 2:
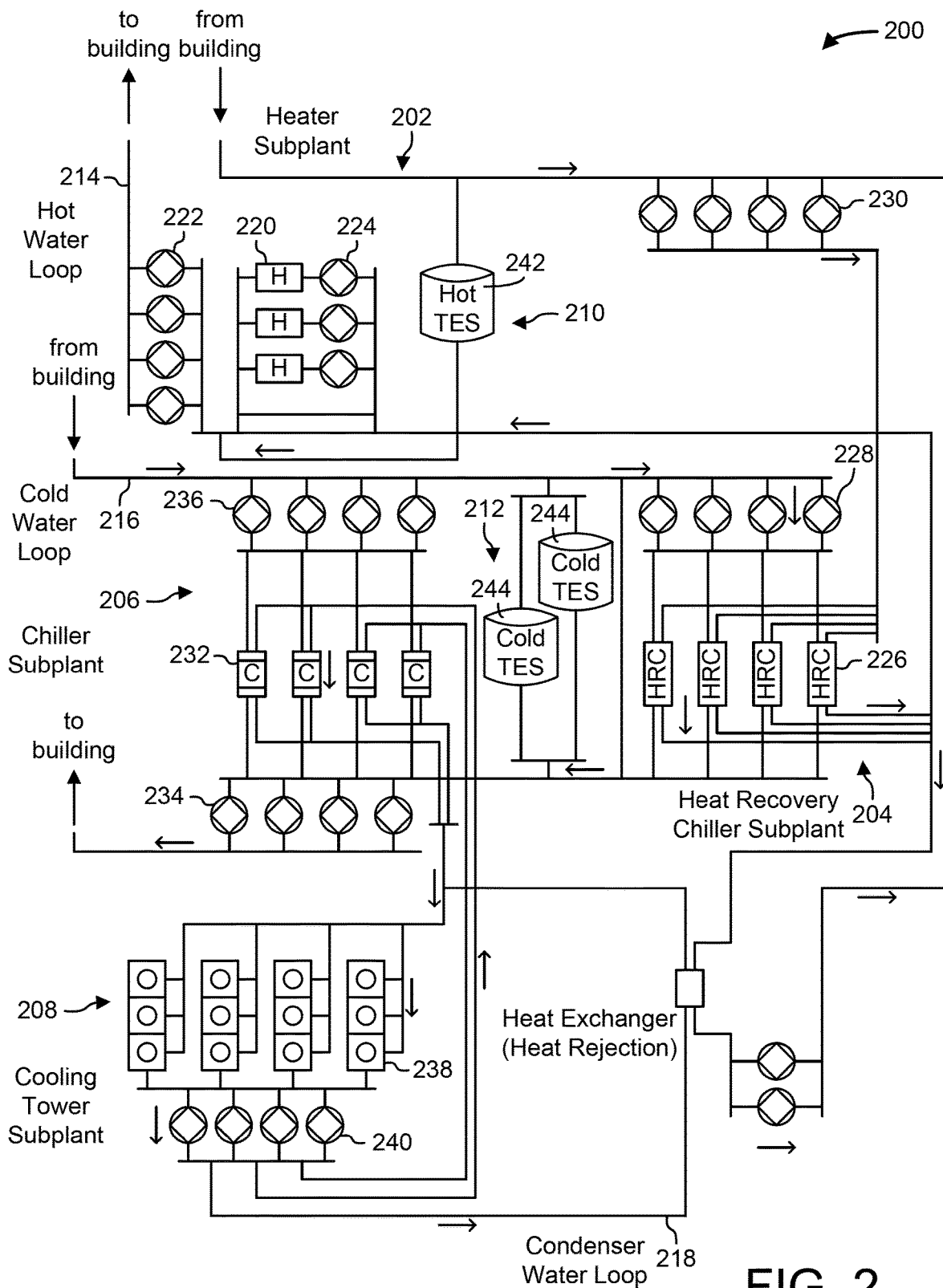
FIG. 2 is a schematic of a waterside system, which can be used as part of the HVAC system of FIG. 1, according to some embodiments.
Figure 3:
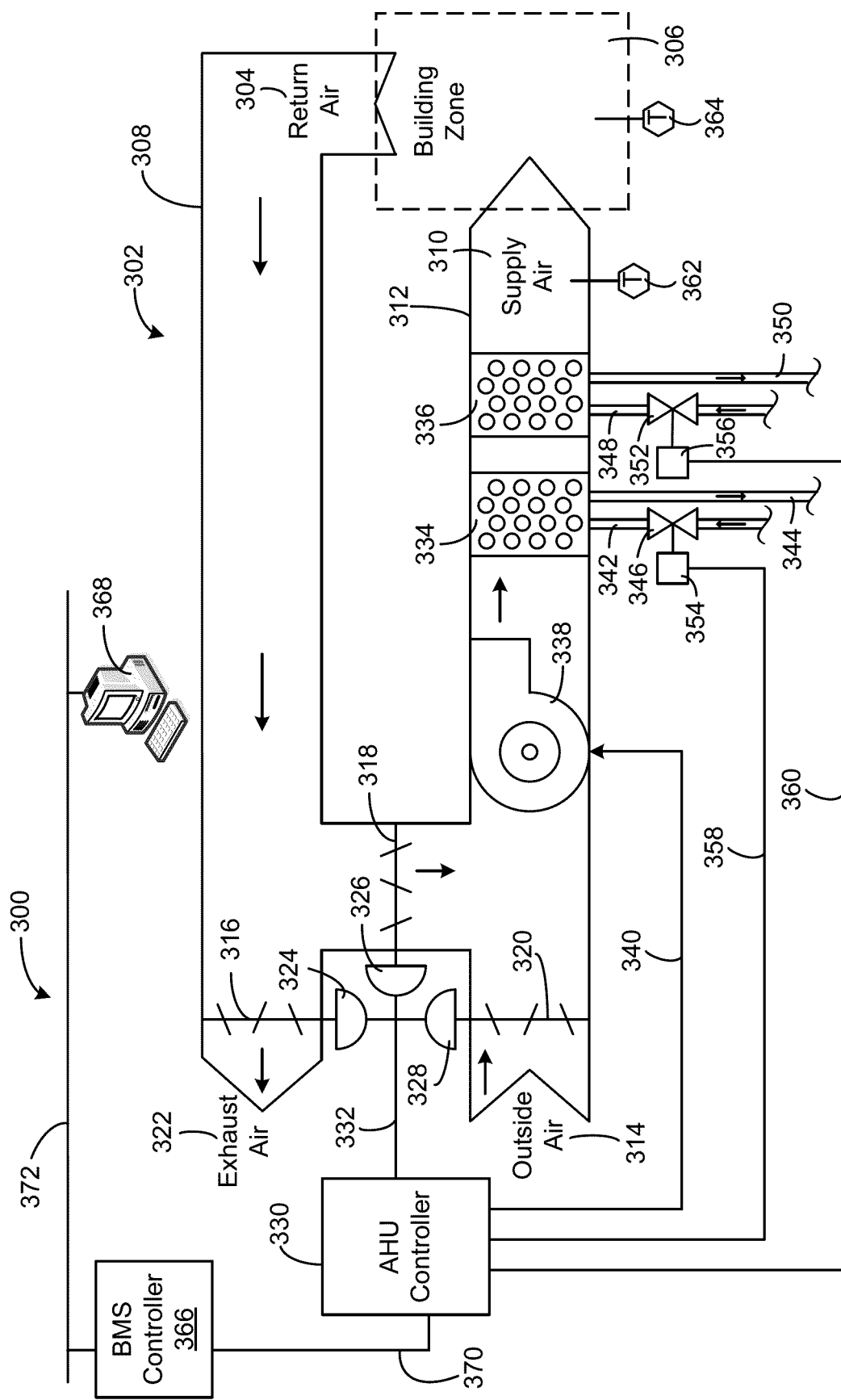
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
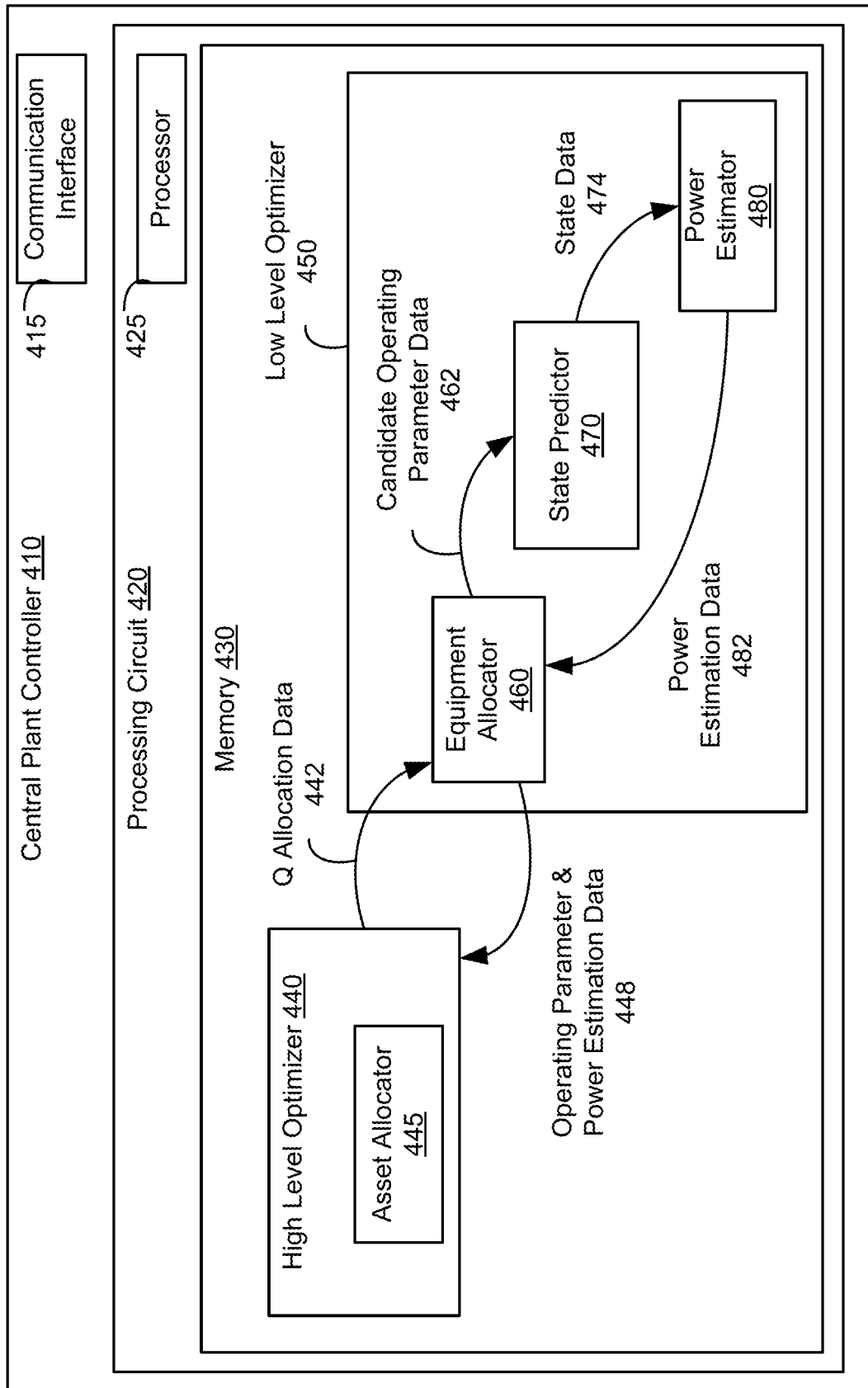
FIG. 4 is a block diagram of a central plant controller, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440 and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The Q allocation data for a particular HVAC device or subplant may indicate the amount of thermal energy (e.g., heating energy, cooling energy) or other resource (e.g., hot water, cold water, steam, electricity, etc.) to be produced by the particular HVAC device or subplant. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{l}_k$ and utility rate information received through a user input or automatically determined by a scheduler (not shown), the asset allocator 445 may determine a distribution of the predicted thermal energy load $\hat{l}_k$ across subplants to minimize the cost. The asset allocator 445 generates the Q allocation data 442 indicating the predicted loads $\hat{l}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta_{HL}^* = \underset{\theta_{HL}}{\mathrm{argmin}}\, J_{HL}(\theta_{HL}) \qquad \text{Eq. (1)}$$

where $\theta_{HL}^*$ contains the optimal high level decisions (e.g., the optimal load $\dot{Q}$ for each of subplants) for the entire prediction period and $J_{HL}$ is the high level cost function.

To find the optimal high level decisions $\theta_{HL}^*$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \Sigma_{k=1}^{n_h} \Sigma_{i=1}^{n_s} [\Sigma_{j=1}^{n_u} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \underset{n_h}{\max}(u_{elec}(\theta_{HL}), u_{max,ele}) \qquad \text{Eq. (3)}$$

where $w_d$ is a weighting term, $C_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," the entire disclosure of which is incorporated by reference herein.

The low level optimizer 450 receives the Q allocation data 442 from the high level optimizer 440, and determines operating parameters (e.g., capacities) of the HVAC devices of the HVAC system 100. In some embodiments, the low level optimization performed by low level optimizer 450 is the same or similar to the low level optimization process described in U.S. patent application Ser. No. 14/634,615 filed Feb. 27, 2015, the entire disclosure of which is incorporated by reference herein. In one or more embodiments, the low level optimizer 450 includes an equipment allocator 460, a state predictor 470, and a power estimator 480. In some embodiments, the low level optimizer 450 includes different, more, or fewer components, or includes components in different arrangements than shown in FIG. 4.

In a general embodiment, the low level optimizer 450 works in conjunction with high level optimizer 440. High level optimizer 440 may determine optimal thermal energy loads such that, when distributed to various subplants within HVAC system 100, the overall cost and/or power consumption of operating HVAC system 100 is minimized. Particularly, these optimal thermal energy loads are provided to low level optimizer 450 as various thermal energy setpoints, and low level optimizer 450 is configured to reach these thermal energy setpoints. The low level optimization may determine which devices of a particular subplant to utilize (e.g., on/off states) and/or operating setpoints (e.g., temperature setpoints, flow setpoints, etc.) for individual devices of the subplant such that energy consumption is minimized while serving the subplant load.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 may determine that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. From different combinations of operating parameters of the first chiller and the second chiller, the equipment allocator 460 selects a candidate set of operating parameters (e.g., 45% capacity of the first chiller and 60% capacity of the second chiller) satisfying loads specified by the Q allocation data 442. Additionally, the equipment allocator 460 generates the candidate operating parameter data 462 indicating the selected candidate set of operating parameters, and provides the candidate operating parameter data 462 to the state predictor 470. Equipment allocator 460 may include various components (e.g., stranded node analyzer, solver simplifier, non-linear solver, etc.) responsible for reducing the computational processing required by non-linear calculations during optimization.

Various methods for computationally reducing the non-linear calculations determined by the non-linear solver. The non-linear solver may be a component of equipment allocator 460. In some embodiments, state predictor 470 reduces the number of thermodynamic states, as described above. In other embodiments, computations of nonlinear equations are accomplished through implementation of graph theory. For example, the non-linear may analyze the nodes and edges of a particular subplant (e.g., graph) in HVAC system 100 and generate a system of equations based on the analyzed data. The non-linear solver may then generate a system of equations based on this data in the form of a matrix (e.g., incidence matrix). By taking various derivatives of the generated matrix, such as the psedoinverse and the laplacian, linear algebra can be performed to computationally reduce the calculations required by the non-linear solver. In some embodiments, the process of implementing graph theory to computationally reduce calculation for a non-linear solver is the same or similar to the process described in U.S. patent application Ser. No. 16/027,132 filed Jul. 3, 2018, the entire disclosure of which is incorporated by reference herein.

In some embodiments, nonlinear calculations are reduced by implementation of sequential quadratic programming (SQP). SQP may be implemented as an iterative method of determining an optimized equation by monitoring the final solution of an equation and perturbing the inputs to determine the change in the output. Monitoring this change in the output (i.e., output gradient), a high gradient can be indicative of a sensitive variable, while a small gradient can be indicative of an insensitive variable, with reference to the output. Implementing this in the non-linear solver can allow for several variables in HVAC system 100 to be optimized using SQP, resulting in computationally faster calculations with the non-linear solver. In some embodiments, the reduction process through implementation of SQP is the same or similar to the process described in U.S. patent application Ser. No. 16/046,953 filed Jul. 26, 2018, the entire disclosure of which is incorporated by reference herein. The various embodiments for decreasing computation time in the non-linear solver may be performed by various components within central plant controller 410. For example, computation reduction may be performed by equipment allocator 460 as described with reference to FIG. 5A below.

In some embodiments, nonlinear calculations are reduced by implementation of stranded node analyses. A stranded node analysis may incorporate aspects of graph theory as described above, such that the non-linear solver may need to determine how HVAC equipment are related to one another. This process is described in greater detail with reference to FIG. 5A below. In some embodiments, the low level optimization and stranded node analysis performed by the low level optimizer 450 are the same or similar to the those described in U.S. patent application Ser. No. 16/046,955 filed Jul. 26, 2018 and titled "Central Plant Control System With Computation Reduction Based On Stranded Node Analysis," the entire disclosure of which is incorporated by reference herein.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters using the linear solver, as described in detail below with respect to FIGS. 5 through 10. In some embodiments, the reduction of thermodynamic states is the same or similar to the process described in U.S. patent application Ser. No. 16/039,076 filed Jul. 18, 2018, the entire disclosure of which is incorporated by reference herein. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the power estimator 480.

Still referring to FIG. 4, power estimator 480 predicts power consumed by the HVAC system 100 based on the state data 474. In one approach, the power estimator 480 determines, for each HVAC device, a predicted power consumption based on thermodynamic states (e.g., pressure values, mass flow values, enthalpy values, etc.) and an operating parameter (e.g., capacity) of the HVAC device. In addition, the power estimator 480 may add power consumptions of the HVAC devices of the HVAC system 100 to obtain a total power consumption of the HVAC system 100. The power estimator 480 generates the power estimation data 482 indicating the total power consumption of the HVAC system 100, power consumption of each HVAC device, or any combination of them, and provides the power estimation data 482 to the equipment allocator 460.

In some embodiments, the equipment allocator 460 compares predicted power consumptions of the HVAC system 100 for multiple sets of operating parameters, and selects a set of operating parameters for operating the HVAC system 100. In one approach, the equipment allocator 460 selects, from the multiple sets of operating parameters, the set of operating parameters rendering the lowest power consumption. Hence, the HVAC system 100 operating based on the set of operating parameters determined by the equipment allocator 460 benefits from reduced power consumption. The equipment allocator 460 may generate the operating parameter and power estimation data 448 indicating the set of operating parameters to operate HVAC devices of the HVAC system 100, predicted power consumptions when operating the HVAC system 100 according to the set of operating parameters, or any combination of them, and provide the operating parameter and power estimation data 448 to the high level optimizer 440.

In some embodiments, the equipment allocator 460 performs a stranded node analysis to remove variables within low level optimizer 450 to reduce computation time during nonlinear calculations. The stranded node analysis includes determining schematic dependencies of HVAC devices of the HVAC system by removing or adding a device and determining any stranded node after removing or adding the device from a list of devices to be evaluated. In one aspect, a device may be removed from the list if it is determined to be disabled or turned off. Conversely, a device may be added to the list if it is determined to be enabled or turned on. For example, after removing a first HVAC device, if a second HVAC device is coupled to a stranded node, then the equipment allocator 460 determines that the second HVAC device is schematically dependent on the first HVAC device (e.g., connected in series with the first HVAC device such that disabling the first HVAC device effectively disables the second HVAC device as well). For another example, if a third HVAC device is not coupled to any stranded node after removing the first HVAC device, then the equipment allocator 460 determines that the third HVAC device is schematically independent from the first HVAC device (e.g., not connected in series with the first HVAC device such that the third HVAC device and first HVAC device can operate independently). Based on the stranded node analysis, the equipment allocator 460 allows the state predictor 470 to omit predicting operating states of inoperable HVAC devices and additional HVAC devices schematically dependent on the inoperable HVAC device. Hence, the state predictor 470 may perform computation for a fewer number of unknowns.

Figure 5A:
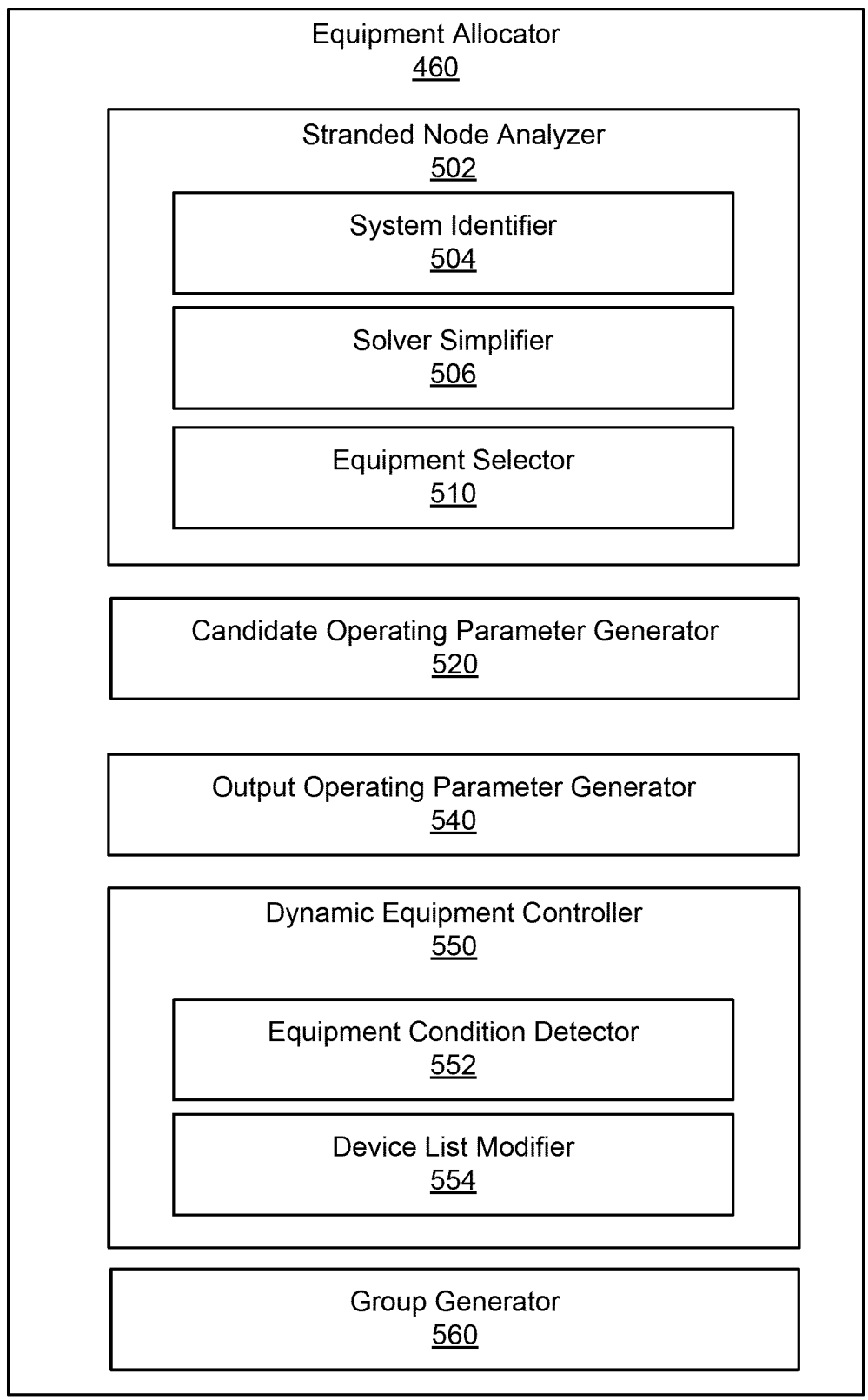
FIG. 5A is a block diagram of an equipment allocator of FIG. 4, according to some embodiments.

Referring to FIG. 5A, illustrated is a block diagram of the equipment allocator 460, according to some embodiments. In one configuration, the equipment allocator 460 includes a stranded node analyzer 502, a candidate operating parameter generator 520, an output operating parameter generator 540, a dynamic equipment controller 550, and a group generator 560. These components operate together to dynamically determine a set of operating parameters rendering an improved performance of the HVAC system for a reduced number of HVAC devices according to change in condition of one or more HVAC devices, and generate operating parameter and power estimation data 448 indicating the determined set of operating parameters and corresponding power consumption of the HVAC system. In some embodiments, the equipment allocator 460 includes additional, fewer, or different components than shown in FIG. 5A.

The stranded node analyzer 502 is a component that performs stranded node analysis to determine schematic dependencies of HVAC devices. A stranded node analysis may be performed to determine how various HVAC equipment are related to one another. In the event that an HVAC device (e.g., a chiller) is communicably connected (e.g., wired connection, wireless connection, etc.) to another HVAC device (e.g., a pump), the connection between the two devices (e.g., the node) may then be considered "stranded," as the connection to the subsequent HVAC device has been severed. In one example, after removing a first HVAC device, if a second HVAC device is coupled to a stranded node, then the stranded node analyzer 502 determines that the second HVAC device is schematically dependent on the first HVAC device. For another example, if a third HVAC device is not coupled to any stranded node after removing the first HVAC device, then the stranded node analyzer 502 determines that the third HVAC device is schematically independent from the first HVAC device. Stranded node analysis disclosed herein allows the central plant controller 410 to reduce a number of HVAC devices or operating states of the HVAC to be predicted. In one implementation, the stranded node analyzer 502 includes a system identifier 504, a solver simplifier 506, and an equipment selector 510. In this configuration, the stranded node analyzer 502 determines schematic dependencies of the HVAC devices, and determines a reduced number of operating states of the HVAC devices to be predicted. In some embodiments, the stranded node analyzer 502 includes additional, fewer, or different components than shown in FIG. 5A.

In some embodiments, stranded node analyzer 502 may eliminate variables from schematic representation. For example, upon determining the chiller C1 is inoperable, stranded node analyzer 502 may remove chiller C1 from schematic representation and update the incidence matrix according. In other embodiments, stranded node analyzer 502 may fix the value of a variable or device control signal such that the device does not have to be solved for. In other words, various non-linear calculations (e.g., non-linear calculations solved by equipment allocator 460 for optimization) require calculations of several variables. It may reduce computational complexity to change a variable to a constant rather than removing the device entirely. In various embodiments, these processes are performed by various components within equipment allocator 460 and are not limited to stranded node analyzer 502.

The system identifier 504 is a component that obtains plant netlist data indicating schematic arrangement of the HVAC devices, and performs stranded node analysis based on the plant netlist data to determine dependencies of the HVAC devices. In some embodiments, the plant netlist data may be converted into an index matrix as described below. As described in the present disclosure, schematic representations may be generated by netlists, incidence matrices, or both. In some embodiments, a netlist defines what HVAC equipment is present in the circuit (e.g., subplant) and the respective nodes of which the HVAC equipment is connected to. In some embodiments, an incidence matrix is a matrix that shows the relationship between two objects. In various embodiments, an incidence matrix is generated from a netlist. For example, subplant X has seven devices and 5 nodes. An incidence matrix is generated that is representative of subplant X, wherein the matrix has 7 rows, per each device, and 5 columns, per each node. A "1" may be generated in the locations of the matrix of which the respective node and device are connected in the netlist. This allows for a mathematical representation of a physical schematic of an HVAC system. An example of an incidence matrix is shown in Eq. (4) below.

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} \quad \text{Eq. (4)}$$

The plant netlist data describe a plurality of HVAC devices (e.g., chillers, boilers, pumps, fans, valves, etc.) of the HVAC system and schematic connections thereof. For example, the schematic arrangement of the HVAC devices of the HVAC system can be represented by plant netlist data as shown below.

Example Plant Netlist

CHWP—PCHWP1—N1—N2
CHWP—PCHWP2—N1—N3
CHLR—Chiller1—N2—N4
CHLR—Chiller2—N3—N4
LOAD—Load1—N4—N1

The example plant netlist above details several attributes of various HVAC devices: device type, device name, and nodal connections (input node and output node). The device type may refer to a code used my equipment allocator 460 a reference to a particular type of device within the netlist. The device name may be the name of a particular device of that general type (e.g., Chiller1 is a type of Chiller (CHLR)). The nodal connections represent the nodes to which each device is connected, the input node being shown first, followed by the output node.

Figure 5B:
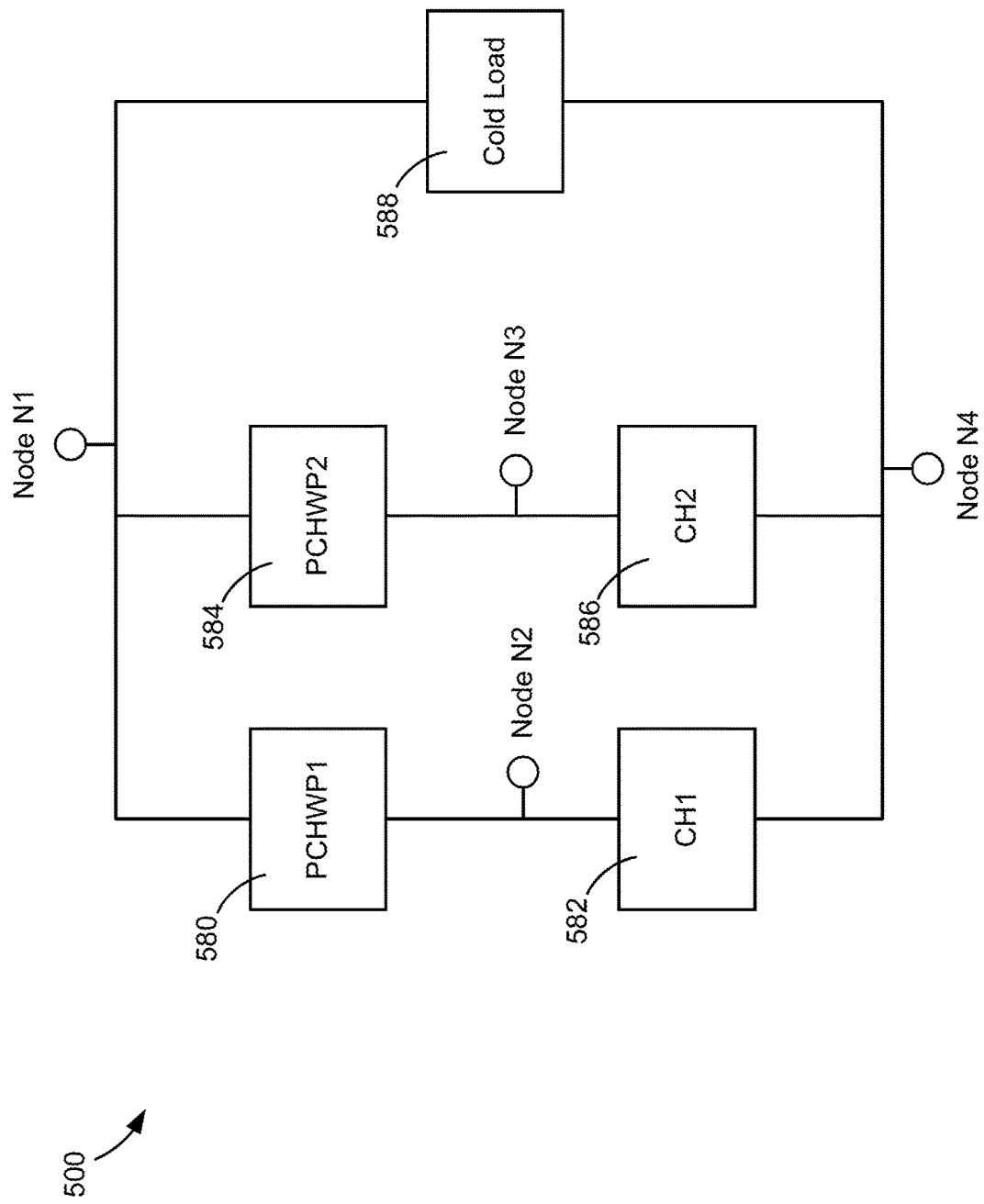
FIG. 5B illustrates an example schematic representation of a HVAC system, according to some embodiments.

Referring now to FIG. 5B, an exemplary embodiment of a schematic representation of the example pant netlist above is shown, according to some embodiments. System 500 of FIG. 5B is shown to include PCHWP1 580, CH1 582, PCHWP2 584, CH2 586, and cold load 588. The first line (row) of the example plant netlist above represents a chilled water pump (type CHWP) named PCHWP1 connected to a first node (N1) as an input node and a second node (N2) as an output node. This is shown in FIG. 5B where PCHWP1 580 is connected to first node (N1) as an input node and a second node (N2) as an output node. Similarly, the third line (row) of the netlist shows a first chiller (CH1 582) connected to node 2 as an input node and node 4 as an output node.

The plant netlist data may be automatically generated based on a graphical user interface allowing a user to schematically define connections of the plurality of HVAC devices. Alternatively, the plant netlist data may be manually entered by a user through a text editor. Schematically representing arrangements of the HVAC devices of the HVAC system enables the state predictor 470 to reduce a number of unknown thermodynamic states to be determined. For example, the HVAC device may determine dependencies of the plurality of HVAC devices, and determine to omit prediction of operating states of one or more HVAC devices that do not contribute to the operation of the HVAC system or do not contribute to a change in the operation of the HVAC system.

In one approach, the system identifier 504 obtains an incidence matrix (e.g., incidence matrix 800A) representing schematic connections of HVAC devices of the HVAC system in a matrix format based on the netlist data. In various embodiments, the incidence matrix A may be an n by m (i.e., n×m) matrix. In one embodiment, each row is associated with a corresponding HVAC device and each column is associated with a corresponding node, such as represented in incidence matrix 800A. In this embodiment, n represents the number of HVAC devices, and m represents the number of nodes. In another embodiment, each row is associated with a corresponding node and each column is associated with a corresponding HVAC device. In this embodiment, n represents the number of nodes, and m represents the number of HVAC devices. Although following descriptions are provided with the incidence matrix with rows corresponding to HVAC devices and columns corresponding to nodes, principles disclosed herein may be applied to an incidence matrix with rows corresponding to nodes and columns corresponding to HVAC devices.

Figure 7A:
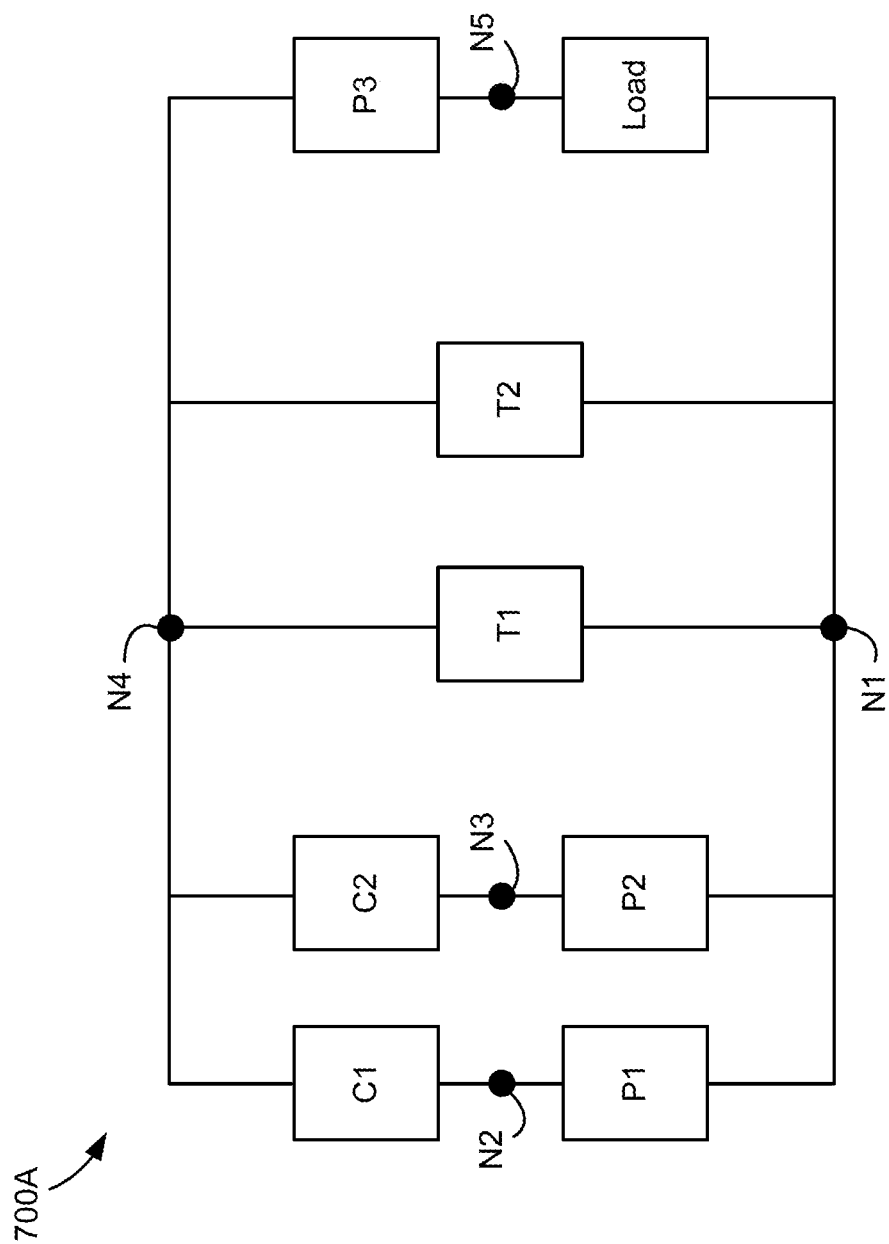
FIG. 7A is an example schematic representation of a HVAC system, according to some embodiments.
Figure 7B:
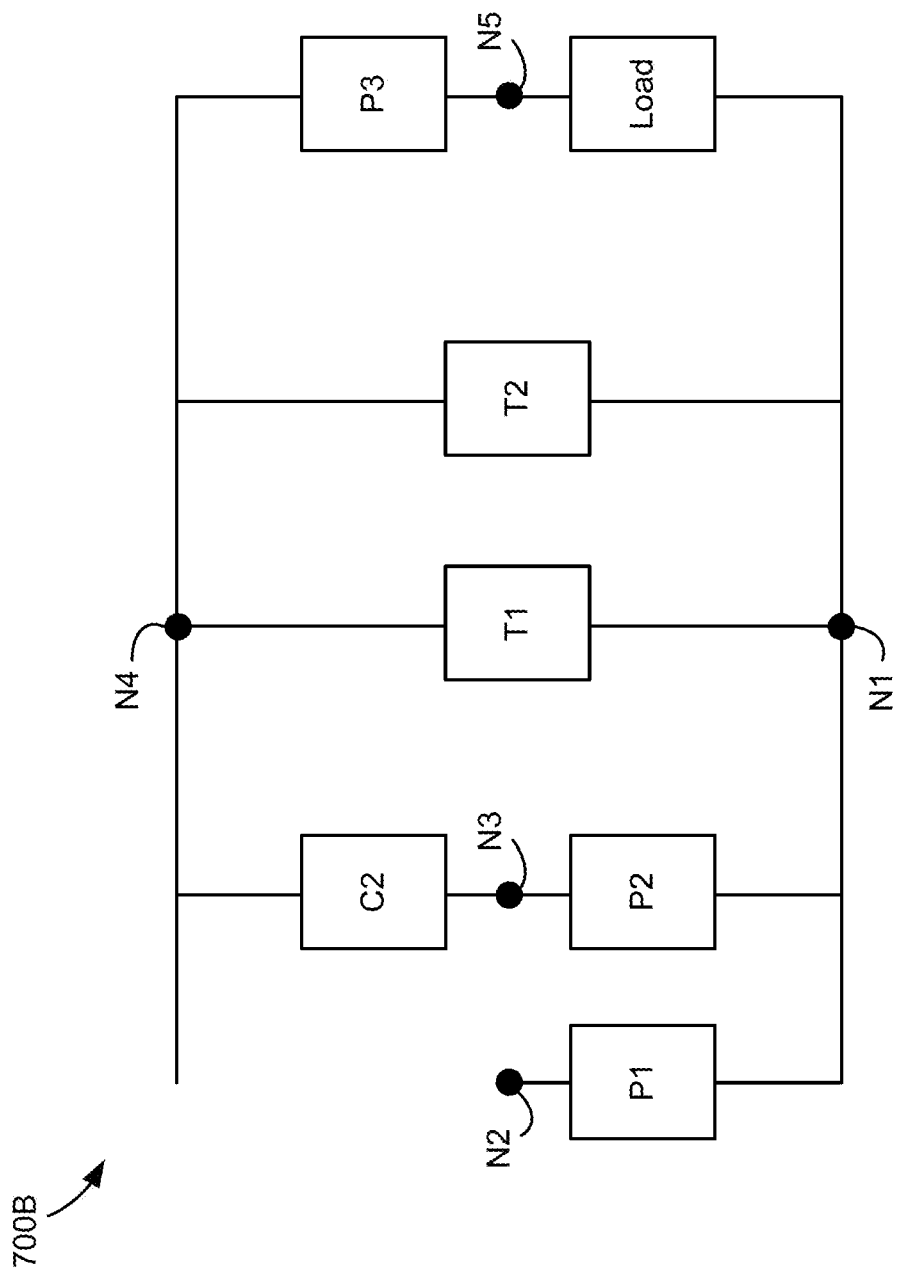
FIG. 7B is an example schematic representation of the HVAC system with a device removed from the schematic representation shown in FIG. 7A, according to some embodiments.

In some embodiments, the incidence matrix A can be modified to adjust updated nodal connections for the various HVAC devices. Modifying the incidence matrix A may include the equipment allocator 460 receiving information that an HVAC device has gone offline (e.g., inoperable, loss of power, broken, etc.). Equipment allocator 460 may remove the offline HVAC device from a schematic representation, resulting in a broken connection from the input node of the removed HVAC device to the output node of the removed HVAC device. System identifier 504 may then determine the various other HVAC devices that are schematically dependent on the removed HVAC device. An example of this is shown in FIGS. 7A-B. Referring to FIG. 7A a first HVAC device C1 is connected to a node at the input (e.g., Node N4 and a node at its output (e.g., N2). A second HVAC device P1 is connected to Node N2 at its input and Node N1 at its output. In the event that HVAC device C1 goes offline, equipment allocator 460 may remove the second HVAC device from a schematic representation, resulting in Node N2 only being connected to HVAC device. This is shown in FIG. 7B, where device C1 is removed from schematic representation. Therefore, Node N2, having only a single device connection, may be considered a stranded node. The process of stranded node analyzer 502 updating schematic representations of HVAC systems, determining which nodal connections between HVAC devices are stranded, and optimizing the nonlinear calculations based on which nodal connections between HVAC devices are stranded may be referred to stranded node analysis. FIGS. 7A-B are described in greater detail below.

In an exemplary embodiment, FIG. 8A displays an incidence matrix for devices within HVAC system 100. FIG. 8A is described in greater detail below, but may described herein at a general level for exemplifying an incidence matrix. In the columns under "devices" of FIG. 8A, device type, device name, and device number are shown. These attributes may, alone or in combination, allow equipment allocator 460 to determine the data which device is being analyzed and the operating parameters for the respective device. The columns under "nodes" may refer to the various nodal connections for each device. In the exemplified embodiment, a "−1" represents the device connection to that node at the input of the device. A "1" represents the device connection to that node at the output of the device. A "0" no direct nodal connection from the device to that node. For example, in the first row of FIG. 1, Chiller C1 is not connected to Node 1, the input of Chiller C1 is connected to Node 2, Chiller C1 is not connected to Node 3, the output of Chiller C1 is connected to Node 4, and Chiller C1 is not connected to Node 5. A schematic representation of the incidence matrix shown in FIG. 8A is shown in FIG. 7A. FIG. 7A and FIG. 8A are described in greater detail below.

Referring back to FIG. 5B, solver simplifier 506 generates a simplified list of HVAC devices based on schematic dependencies of the HVAC devices. For example, the solver simplifier 506 obtains a list of HVAC devices that are operable or inoperable from the high level optimizer 440. The solver simplifier 506 may remove or exclude devices schematically dependent on inoperable HVAC devices from the list of HVAC devices. The solver simplifier 506 may add devices schematically dependent on operable HVAC devices to the list of HVAC devices. The solver simplifier 506 may perform the process of modifying the incident matrix A as illustrated above to obtain the simplified list of HVAC devices. A detailed process of solver simplifier generated a simplified list of HVAC devices based on schematic dependencies of the HVAC devices is disclosed with reference to FIGS. 7A-C in conjunction with FIGS. 8A-C below.

The equipment selector 510 is a component that receives the Q allocation data 442 from the high level optimizer 440, and determines a set of operating parameters of HVAC system 100 according to the Q allocation data 442. In one implementation, the equipment selector 510 stores a look up table (i.e., LUT) indicating a relationship between thermal energy loads and corresponding sets or ranges of operating parameters of the HVAC system. For example, the equipment selector 510 receives the Q allocation data 442 indicating a target thermal energy load of a heater and a target thermal energy load of a cooler. In this example, the equipment selector 510 may determine that a first range of the operating parameter of the heater corresponds to the target thermal energy load of the heater and a second range of the operating parameter of the heater corresponds to the target thermal energy load of the cooler based on the look up table. In one aspect, the equipment selector 510 determines a set of operating parameters of HVAC devices in the simplified list from the solver simplifier 506.

The dynamic equipment controller 550 is a component that detects a change in various conditions (e.g., conditions of a HVAC devices, outdoor air temperature, operating schedule for the dive, measurements form the system, change in required load, etc.), and modifies a list of HVAC devices to determine operating parameters. Various changes and the effect of detecting the various changes are described in greater detail with reference to FIG. 12. In some embodiments, the dynamic equipment controller 550 includes an equipment condition detector 552 and a device list modifier 554. In some embodiments, the components of the dynamic equipment controller 550 operate together with the components of the stranded node analyzer 502 or are implemented by the stranded node analyzer 502. In some embodiments, the dynamic equipment controller 550 includes more, fewer, or different components than shown in FIG. 5A.

The equipment condition detector 552 is a component that detects an operating condition of HVAC devices. In one approach, the equipment condition detector 552 receives sensor values indicating internal or external characteristic (e.g., temperature, pressure, flow rate, etc.) of a HVAC device, and compares the characteristic of the HVAC device against a corresponding threshold. In one example, if the characteristic of the HVAC device exceeds the corresponding threshold, the equipment condition detector 552 may determine that the HVAC device is inoperable, hence should be turned off or disabled. Alternatively, if the characteristic of the HVAC device exceeds the corresponding threshold, the equipment condition detector 552 may determine that the HVAC device is operable, hence should be turned on or enabled. If the characteristic of the HVAC device is below the corresponding threshold, the equipment condition detector 552 may determine that the HVAC device is operable, hence should be turned on or enabled. Alternatively, if the characteristic of the HVAC device exceeds the corresponding threshold, the equipment condition detector 552 may determine that the HVAC device is inoperable, hence should be turned off or disabled. In some embodiments, if the characteristic of the HVAC device exceeds the corresponding threshold, equipment condition detector 552 may determine that the HVAC device is operable. In one approach, the equipment condition detector 552 receives data indicating internal or external characteristic (e.g., temperature, pressure, flow rate, etc.) of a HVAC device, and compares an amount of change in the characteristic of the HVAC device against a corresponding threshold amount. The threshold amount may be predetermined or dynamically adjusted. In one example, if the amount of change in the characteristic of the HVAC device exceeds the corresponding threshold for a predetermined time period (e.g., 5 minutes), the equipment condition detector 552 may determine that the HVAC device is inoperable. Similarly, if the amount of change in the characteristic of the HVAC device is below the corresponding threshold for a predetermined time period (e.g., 5 minutes), the equipment condition detector 552 may determine that the HVAC device is operable. In some embodiments, if the characteristic of the HVAC device exceeds the corresponding threshold, equipment condition detector 552 may determine that the HVAC device is operable. Alternatively, if the characteristic of the HVAC device drops below the corresponding threshold, equipment condition detector 552 may determine that the HVAC device is inoperable. Several more examples regarding operating conditions of devices within HVAC system 100 are described in greater detail with reference to FIG. 12 below.

The device list modifier 554 is a component that modifies a list of HVAC devices to determine operating parameters according to the determined operating condition of one or more HVAC devices. In one approach, the device list modifier 554 configures the stranded node analyzer 502 to modify a list of HVAC devices to determine the operating parameters according to operable or inoperable condition of HVAC device. Hence, operating parameters of the modified list of HVAC devices can be dynamically determined according to changed conditions (e.g., external temperature) of HVAC devices, and HVAC devices can be operated in a computationally efficient manner.

The group generator 560 is a component that groups HVAC devices. In some embodiments, the functionality of group generator 560 is similar to the processes described in U.S. patent application Ser. No. 16/118,962 filed Aug. 31, 2018, the entire disclosure of which is incorporated by reference herein. In one aspect, the group generator 560 groups HVAC devices that are schematically connected in parallel, and stores group data indicating grouped HVAC devices. In some embodiments, the group generator 560 operates together with the stranded node analyzer 502, the dynamic equipment controller 550, other components of the equipment allocator 460, or any combination of them. In one approach, the group generator 560 obtains netlist data representing schematic connections of HVAC devices, and determines a group of HVAC devices that operates independently or do not overlap with another group of HVAC devices. In one aspect, each group of HVAC devices operates independently or does not schematically overlap with the other groups of HVAC devices. In some embodiments, the group generator 560 generates group data, in response to detecting a change in condition of one or more HVAC devices. For example, the group generator 560 detects that a HVAC device is disabled during operation of the central plant, and determines a largest group of HVAC devices that includes one or more nodes associated with the disabled HVAC device and operates independently from other groups of HVAC devices. For another example, the group generator 560 detects that a HVAC device is enabled during operation of the central plant, and determines a largest group of HVAC devices that includes one or more nodes associated with the enabled HVAC device and operates independently from other groups of HVAC devices. In some embodiments, the group generator 560 divides a group of HVAC devices into cycles, where a cycle is a set of HVAC devices that are coupled to each other in parallel. In one aspect, the group generator 560 determines a subsystem including same type of HVAC devices that are connected to each other in parallel. By dynamically grouping and identifying subsystems in response to a change in condition of one or more HVAC devices, workload may be dynamically distributed among the HVAC devices in the subsystem.

The candidate operating parameter generator 520 is a component that interfaces with the state predictor 470, and generates candidate operating parameter data 462 based on the operating parameters of the HVAC system. The candidate operating parameter generator 520 may generate the candidate operating parameter data 462 based on operating parameters of the HVAC devices in the simplified list from the equipment allocator 460. The candidate operating parameter generator 520 may provide the candidate operating parameter data 462 to the state predictor 470. Because the candidate operating parameter data 462 indicate operating parameters of the HVAC devices in the simplified list, rather than operating parameters of full HVAC devices of the HVAC system, computation resources for predicting operating states of the HVAC devices by the state predictor 470 may be conserved.

The output operating parameter generator 540 is a component that determines a set of operating parameters for operating the HVAC system, and provides the operating parameter and power estimation data 448 indicating the set of operating parameters and predicted power consumption. In one example, the output operating parameter generator 540 determines, from different sets of operating parameters, the set of operating parameters rendering the lowest power consumption.

Referring to FIG. 6 illustrated is an example schematic representation of a HVAC system 600, according to some embodiments. The example HVAC system 600 includes pumps P1, P2, P3, P4, and chillers C1, C2. The pump P1 is coupled to the chiller C1 at node N2 in series between nodes N1, N4, and the pump P2 is coupled to the chiller C2 at node N3 in series between nodes N1, N4. Hence, the pump P1 and the chiller C1 are coupled to the pump P2 and the chiller C2 in parallel. The pump P3 is coupled to the pump P4 in parallel between nodes N1 and N4.

In one example, the central plant controller 410 dynamically detects a volatile change in pump pressure within pump P2 via one or more pressure sensors and determines that the pump P2 is inoperable. Assuming that the pump P2 and the chiller C2 were both enabled or operable, and after detecting volatile change in pump pressure within pump P2, the central plant controller 410 determines that the chiller C2 is schematically dependent on the pump P2 through a stranded node analysis, as after removing or disabling the pump P2, the node N3 becomes stranded. Hence, the central plant controller 410 generates a list of HVAC devices including the pumps P1, P3, P4 and the chiller C1 for determining operating parameters without the pump P2 and the chiller C2 that are schematically dependent on each other. Moreover, the central plant controller 410 dynamically determines operating parameters of the pumps P1, P3, P4 and the chiller C1 according to the change in condition of the pump P2. Various examples of schematic updates based on various conditions are described in greater detail with reference to FIG. 12 below.

Referring to FIG. 7A, illustrated is an example schematic representation 700A of a HVAC system, according to some embodiments. Referring to FIG. 8A, illustrated is an example incidence matrix 800A of the HVAC system representing schematic connections of the HVAC system of FIG. 7A, according to some embodiments. In one example, C1 represents the Office of Statewide Health Planning and Development (OSHPD) chiller plant with P1 being its primary pump, C2 represents the heat recovery chiller (HRC) Chiller Plant with P2 being its primary pump, and P3 represents the secondary pump. If the high level optimizer 440 indicates that the OSHPD plant is inoperable or should be disabled, the low level optimizer 450 may remove the OSHPD plant from the incidence matrix 800B, as shown below in FIG. 7B or FIG. 8B. For example, the value '−1' in an element 810 is substituted by '0', and the value '1' in an element 815 is substituted by '0'.

Referring to FIG. 7B, illustrated is an example schematic representation 700B of the HVAC system with a device removed from the schematic representation shown in FIG. 7A, according to some embodiments. Referring to FIG. 8B, illustrated is an example incidence matrix 800B of the HVAC system representing schematic connections of the HVAC system of FIG. 7B, according to some embodiments. Removal of C1 leaves the P1 connected to a stranded node N2, meaning P1 can also be removed. The node N4 connected to C2 is not left stranded, as there are still inlets (C2 and the Tank), and outlets (P3 and the Tank). In one approach, a column 820 of the incidence matrix having a value '1' or '−1' but not having a pair of '1' and '−1' is detected. Such column 820 represents a stranded node. Node N4 is not a stranded node, because column 825 has at least a pair of '−1' and '1'. If a stranded node is detected, a row 830 containing a nonzero value of the detected column 820 is identified. Such row 830 corresponds to a HVAC device P1 schematically dependent on the removed HVAC device C1.

Figure 7C:
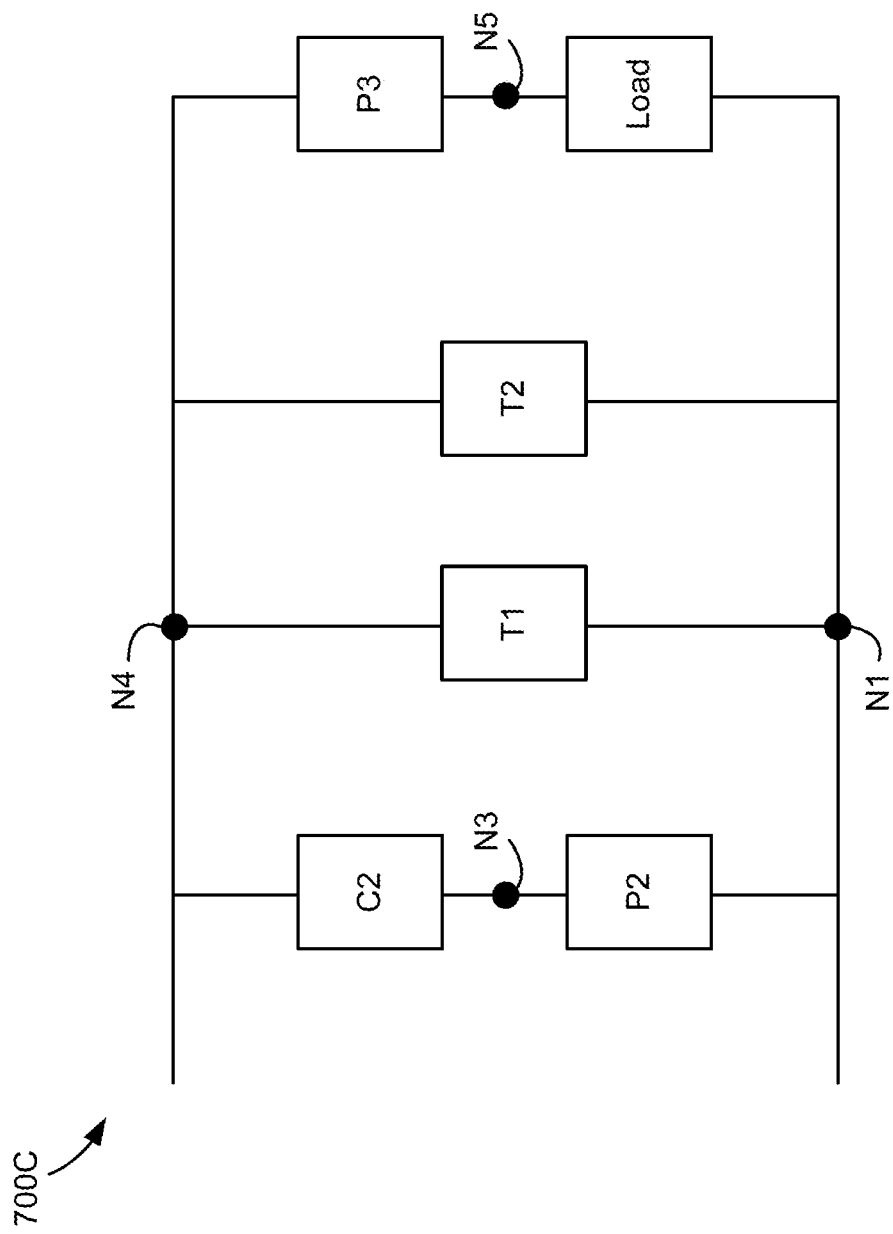
FIG. 7C is an example schematic representation of the HVAC system after removing another device dependent on the removed device of FIG. 7B, according to some embodiments.

Referring to FIG. 7C, illustrated is an example schematic representation 700C of the HVAC system after removing another device dependent on the removed device of FIG. 7B, according to some embodiments. Referring to FIG. 8C, illustrated is an example incidence matrix 800C of the HVAC system representing schematic connections of the HVAC system of FIG. 7C, according to some embodiments. After removing P1, the simplified schematic representation of HVAC system can be obtained as shown in FIG. 7C or FIG. 8C. For example, the value '−1' in an element 840 is substituted by '0', and the value '1' in an element 845 is substituted by '0'.

Figure 9:
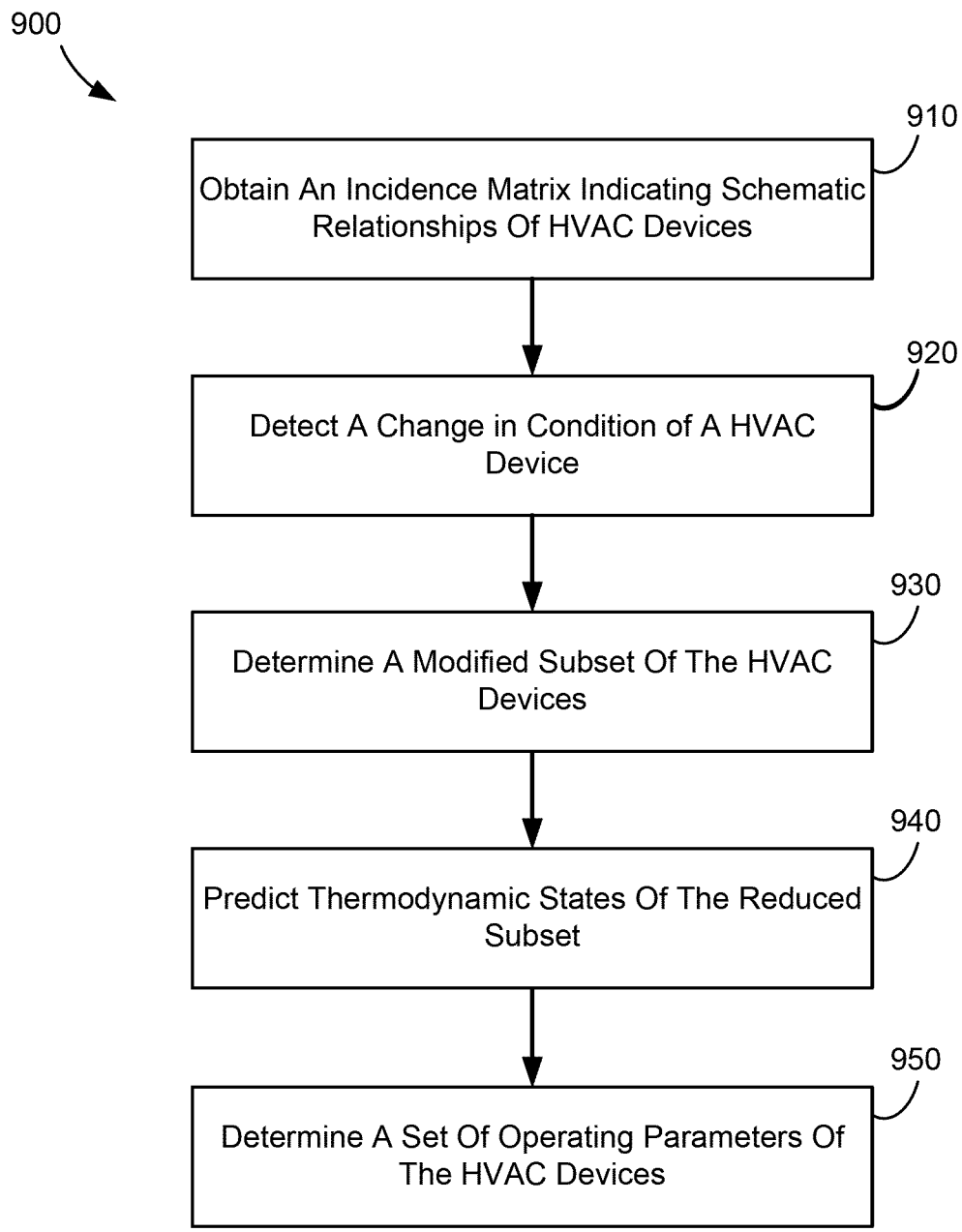
FIG. 9 is a flow chart illustrating a process of dynamically determining a set of operating parameters of HVAC devices, according to some embodiments.

FIG. 9 is a flow chart illustrating a process 900 of dynamically determining a set of operating parameters of HVAC devices, according to some embodiments. The process 900 may be performed by the low level optimizer 450 of FIG. 4. In some embodiments, the process 900 may be performed by other entities. In some embodiments, the process 900 may include additional, fewer, or different steps than shown in FIG. 9.

The low level optimizer 450 obtains an incidence matrix indicating schematic relationships of HVAC devices (step 910). The low level optimizer 450 may obtain plant netlist data representing schematic connections of HVAC devices, and generate the incidence matrix according to the plant netlist data. In one example, the incidence matrix A may be an n by m matrix. In one embodiment, each row is associated with a corresponding HVAC device and each column is associated with a corresponding node. In this embodiment, n represents the number of HVAC devices, and m represents the number of nodes. A HVAC device coupled to a node through an input of the HVAC device may have a value of −1, and a HVAC device coupled to the node through an output of the HVAC device may have a value of 1.

The low level optimizer 450 detects a change in condition of a HVAC device (step 920). The low level optimizer 450 may obtain sensor values indicating internal or external characteristic (e.g., temperature, pressure, flow rate, etc.) of the HVAC device as the operating condition of the HVAC device. The low level optimizer 450 may obtain the sensor values through the communication interface 415, and determine the operating condition of the HVAC device according to the sensor data. In one approach, the low level optimizer 450 compares the sensed value against a threshold value, and determines whether the HVAC device is operable or inoperable according to the comparison. In another approach, the low level optimizer 450 determines an operating state, from a plurality of operating states, of the HVAC device according to the comparison. For example, if the external temperature of the HVAC device exceeds a threshold value, the low level optimizer 450 determines that the HVAC device is inoperable. For another example, if the external temperature of the HVAC device drops below the threshold value, the low level optimizer 450 determines that the HVAC device is operable.

The low level optimizer 450 determines a modified subset of the HVAC devices based on the schematic relationships and the detected changed condition of the HVAC device (step 930). In one approach, the low level optimizer 450 may generate a list of a subset of HVAC devices, of which thermodynamic states are to be determined. The low level optimizer 450 may identify an inoperable device and exclude HVAC devices that are schematically dependent on the inoperable device from the list. In one approach, the low level optimizer 450 performs a stranded node analysis based on the incidence matrix, and determines a modified subset of the HVAC devices. In one example, the low level optimizer 450 generates or substitutes values of an inoperable HVAC device (or disabled device) with '0'. In one example, the low level optimizer 450 generates or substitutes a value of operable HVAC devices (or enabled device) with '1' or '−1' depending on a flow direction. If a column contains a nonzero value but no longer contains a pair of '1' and '−1', then one or more rows in the incidence matrix A that contain nonzero values in that column indicate that corresponding HVAC devices are schematically dependent on the inoperable HVAC device. The low level optimizer 450 may iteratively identify additional schematically dependent HVAC devices by further substituting values of schematically dependent HVAC devices with '0', and determining whether any column has either '1' or '−1' but no longer contains a pair of '1' and a '−1'. Similarly, the low level optimizer 450 may identify an operable device and include HVAC devices that are schematically dependent on the operable device to the list.

The low level optimizer 450 predicts thermodynamic states of the reduced subset (step 940), and determines a set of operating parameters of the HVAC device (step 950). In one approach, the low level optimizer 450 determines thermodynamic states of HVAC devices in the modified list, for example, through a non-linear solver, and determines a set of operating parameters of the HVAC devices that render an optimal performance (e.g., lowest power consumption). The controller 410 may operate HVAC devices according to the determined set of operating parameters.

Figure 10:
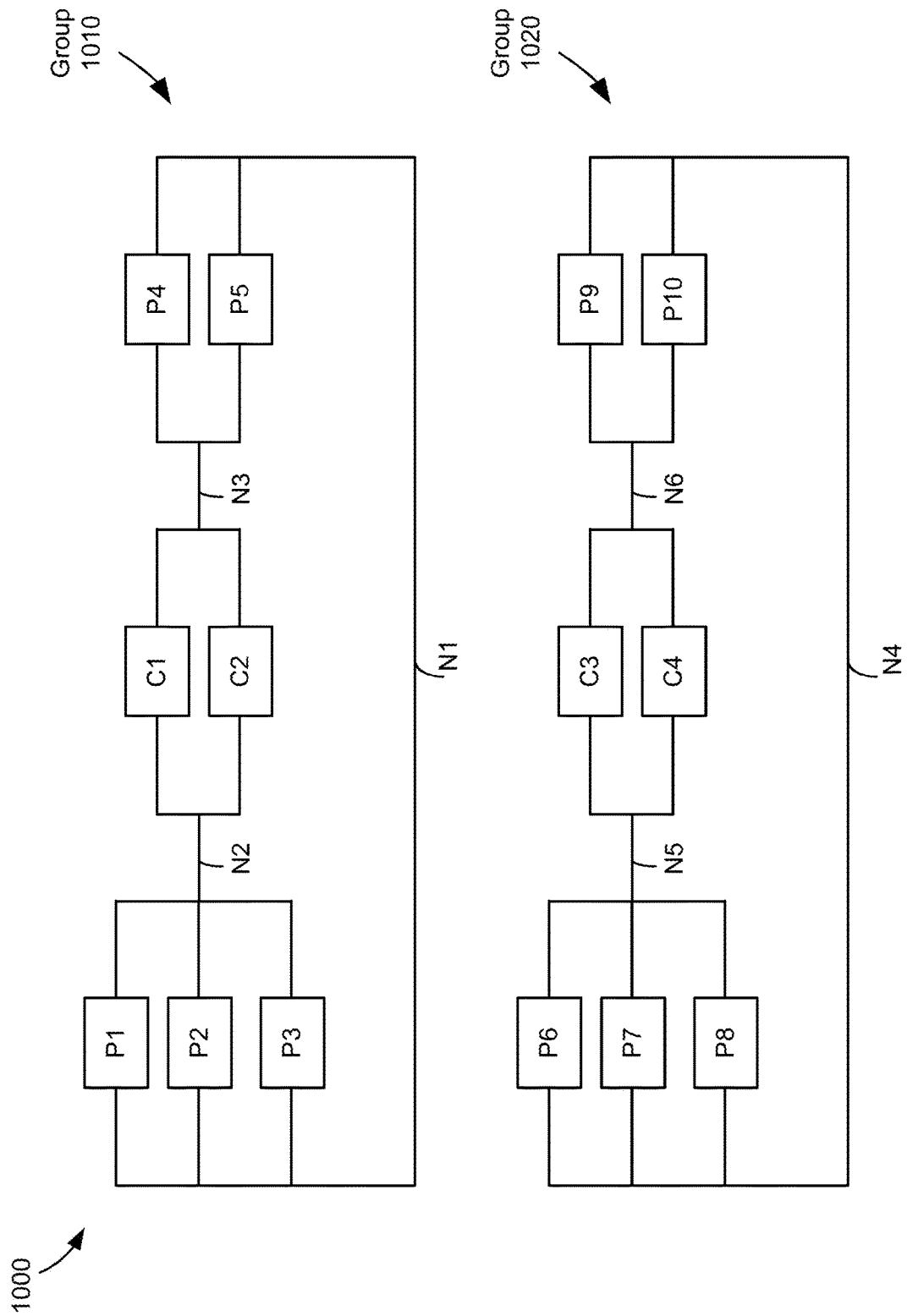
FIG. 10 is an example schematic representation of the HVAC system including HVAC devices in separate groups, according to some embodiments.

FIG. 10 is an example schematic representation of the HVAC system 1000 including HVAC devices in separate groups, according to some embodiments. The example HVAC system 1000 includes two groups 1010 and 1020. In one aspect, the HVAC devices of the group 1010 are schematically independent from, or schematically do not overlap with the HVAC devices of the group 1020. The groups 1010, 1020 may be schematically independent from each other because of a change in condition of one or more HVAC devices that are coupled between HVAC devices in different groups 1010, 1020.

In FIG. 10, the group 1010 includes pumps P1, P2, P3, P4, P5 and chillers C1, C2. In one example, the pumps P1, P2, P3 are coupled to each other in parallel between the nodes N1, N2, the chillers C1, C2 are coupled to each other in parallel between the nodes N2, N3, and the pumps P4, P5 are coupled to each other in parallel between the nodes N3, N1. The group 1020 includes pumps P6, P7, P8, P9, P10 and chillers C3, C4. Moreover, the pumps P6, P7, P8 are coupled to each other in parallel between the nodes N4, N5, the chillers C3, C4 are coupled to each other in parallel between the nodes N5, N6, and the pumps P9, P10 are coupled to each other in parallel between the nodes N6, N4. The HVAC devices of the HVAC system 1000 may be grouped into the groups 1010, 1020, according to a change in condition of one or more HVAC devices of the HVAC system 1000. An example approach of grouping HVAC devices is described below with respect to FIG. 11.

Figure 11:
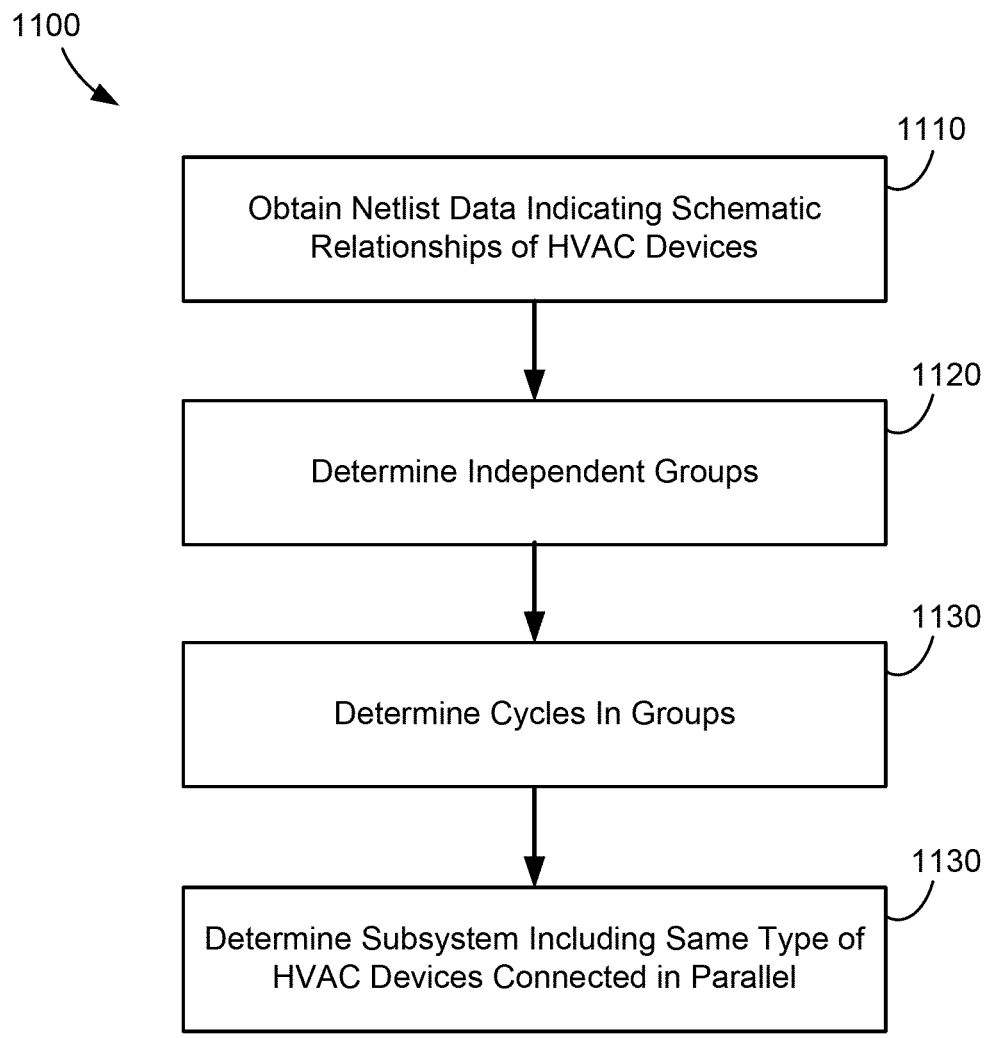
FIG. 11 is a flow chart illustrating a process of dynamically grouping HVAC devices, according to some embodiments.

FIG. 11 is a flow chart illustrating a process 1100 of dynamically grouping HVAC devices, according to some embodiments. The process 1100 may be performed by one or more components of the low level optimizer 450 of FIG. 4 including, for example, the group generator 560. The process 1100 may include performing any of the functions descried with reference to the group generator 560. In some embodiments, the process 1100 may be performed by other entities. In some embodiments, the process 1100 may include additional, fewer, or different steps than shown in FIG. 11.

In one example, the low level optimizer 450 obtains netlist data indicating schematic relationships of the HVAC devices of the HVAC system 1000 (step 1110), and determines independent groups of HVAC devices based on the netlist data (step 1120). For example, the low level optimizer 450 determines groups 1010, 1020 of HVAC devices that do not schematically overlap with each other. In one approach, the low level optimizer 450 dynamically determines independent groups of HVAC devices, in response to detecting a change in condition of one or more HVAC devices. Referring to FIG. 10, for example, the low level optimizer 450 detects that a HVAC device connected between nodes N1, N4 is removed or disabled during operation of the central plant, and determines largest groups 1010, 1020 of HVAC devices that include nodes N1, N4 associated with the removed or disabled HVAC device. For another example, the low level optimizer 450 detects that one or more HVAC devices are added or enabled between nodes N1, N4 during operation of the central plant, and determines a largest group of HVAC devices that include nodes N1, N4 associated with the added or enabled HVAC devices.

Moreover, the low level optimizer 450 may divide groups 1010, 1020 of HVAC devices into cycles (step 1130). A cycle is a set of HVAC devices that are coupled to each other in parallel. Referring to FIG. 10, for example, pumps P1, P2, P3 form a first cycle, chillers C1, C2 form a second cycle, and pumps P4, P5 form a third cycle in the group 1010. Additionally, pumps P6, P7, P8 form a first cycle, chillers C3, C4 form a second cycle, and pumps P9, P10 form a third cycle in the group 1020.

The low level optimizer 450 determines a subsystem including same type of HVAC devices that are connected to each other in parallel (step 1140). In one aspect, same type of HVAC devices that are connected in parallel that were not identified by the high level optimizer 440 may be identified by the low level optimizer 450. In another aspect, HVAC devices of the same type that are connected to each other in parallel can be identified in response to a change in condition of one or more HVAC devices, and workload may be dynamically distributed among the HVAC devices in the subsystem.

Dynamic Optimization

FIGS. 1-11 variously disclose different embodiments of utilizing a central plant controller to implement high level and low level optimization. For example, FIGS. 7A-C disclose embodiments of implementing a stranded node analysis via equipment allocator 460 in low level optimizer 450, according to some embodiments. In another example, FIG. 11 discloses a process 1100 of dynamically determining groups and/or cycles for HVAC devices that may be performed by the low level optimizer 450, according to some embodiments. Although these components and processes are described separately for ease of explanation, it should be understood that control circuitry for HVAC system 100 (e.g., central plant controller 410) may implement various device grouping/removal processes (e.g., stranded node analyses, device removal from netlists, stranded subplant analyses, dynamically grouping HVAC devices, etc.) and/or the components that perform these processes either alone or combination with each other. For example, central plant controller 410 may both determine one or more subsystems including the same type of HVAC devices that are connected to each other in parallel (as shown in FIG. 11) and implement a stranded node analysis via equipment allocator 460 (as shown in FIGS. 7-8) on the one or more subsystem. Various embodiments of different processes are described below.

Figure 12:
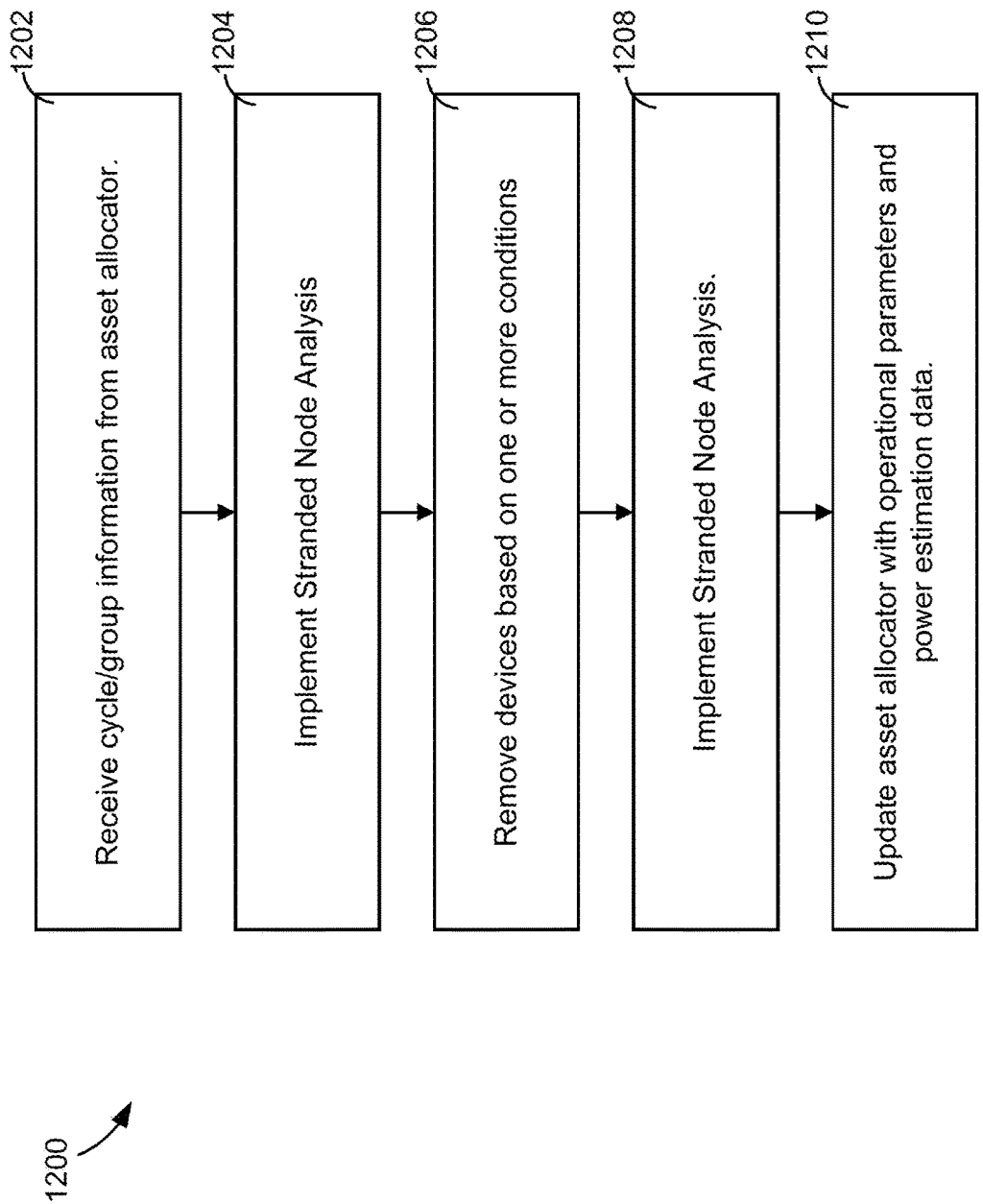
FIG. 12 is a process for optimizing an HVAC system, which can be implemented by the controller of FIG. 4, according to some embodiments.

Referring now to FIG. 12, a process 1200 for optimizing an HVAC system is shown, according to some embodiments. Process 1200 can be performed by various control circuitry in HVAC system 100, such as low level optimizer 450, according to some embodiments. In some embodiments, various steps or combinations of steps in process 1200 may be referred to as "stages" in the present disclosure. For example, process 1200 is shown to include removing devices based on one or more conditions (step 1206), which may be referred to as the second stage (e.g., $2^{nd}$ Stage, Stage Two, etc.). Process 1200 may represent a general optimization process for low level optimizer 450.

Process 1200 is shown to include receiving cycle/group information from asset allocator (step 1202). In some embodiments, equipment allocator 460 may provide group/cycle data via group generator 560 as described above. In various embodiments, asset allocator 460 may decide to exclude one or more subplants from HVAC system 100 and remove the excluded subplant from an incidence matrix representation. This may prevent low level optimizer 450 from providing control signals to the various equipment within the excluded subplant. In other embodiments, asset allocator 460 may choose to include a subplant periodically and exclude a subplant periodically. This may result in the actuation of one or more valves within HVAC system 100 that can include or isolate a particular subsystem based on instructions from asset allocator 460. Various examples of the embodiments described above are described in greater detail with reference to FIGS. 13A-B.

Process 1200 is shown to include implementing a stranded node analysis (step 1204). The stranded node analysis may be performed by the low level optimizer 450 and is the same or similar to those described in U.S. patent application Ser. No. 16/046,955 filed Jul. 26, 2018 and titled "Central Plant Control System With Computation Reduction Based On Stranded Node Analysis," which is incorporated by reference herein. Step 1204 may be referred to as the Stage 3 in process 1200 and be implemented after Stage 1, after Stage 2, or both (as shown in FIG. 12). In step 1204, low level optimizer 450 may monitor the high level groupings of HVAC system 100 (e.g., subplants, etc.) to determine if any stranded nodes are present.

Process 1200 is shown to include removing devices based on one or more conditions (step 1206). "Devices," as used herein may refer to any HVAC component or other building device capable of altering an environmental condition either directly or indirectly. In some embodiments, devices may include chillers, boilers, pumps valves, heating coils, and various other HVAC devices. In other embodiments, devices may include external HVAC devices such as an outdoor air temperature sensor. In some embodiments, devices include the various devices as shown in FIGS. 8A-C. Step 1206 may be performed by various components within equipment allocator 460, such as dynamic equipment controller 550. Step 1206 may include removing devices from an incident matrix (e.g., matrix 8A) such that equipment allocator 460 in low level optimizer 450 is restricted from providing the device with control signals during optimization.

For example, asset allocator 445 determines that subplant A is not required to perform optimization of HVAC system 100, but subplant B is required. Equipment allocator 460 may then evaluate various devices within subplant B on a device-by-device basis to determine if the devices are required in the optimization of system 100. Various examples of conditions within step 1206 are described below.

In some embodiments, step 1206 is implemented in schematic representation 700A as shown in FIG. 7A. Asset allocator 445 determines that the thermal energy needs during optimization does not require chiller C1 for operation. Equipment allocator 460 may then implement a stranded node analysis (e.g., $3^{rd}$ stage) to determine schematic dependencies of HVAC devices based on chiller C1 and, as a result, remove pump P1 from the representation. Equipment allocator 460 may then implement the $2^{nd}$ stage of process 1200 to determine if any devices require removal with respect to the schematic representation generated by equipment allocator 460, resulting in an updated incidence matrix. In some embodiments, removal of a device may be performed when a device is no longer capable of causing further change in a measured variable. For example chiller C1 may attempt to chiller 232 (as shown in FIG. 2) may attempt to reach a water temperature setpoint of 6° C. At a 700 kW capacity at full-load, chiller 232 is incapable of lowering the water temperature, which is currently at 7° C., any lower. Accordingly, asset allocator 445 removes chiller 232 schematic representation and updates the incidence matrix accordingly.

In some embodiments, removal of a device may be performed when a device may operate outside of normal operating parameters required by hysteresis. For example, valve 346 (as shown in FIG. 3) may allow or restrict fluid from entering cooling coil 334. Operational parameters may have been implemented such that valve 346 is required to allow chilled fluid to enter cooling coil 334 when building zone temperatures rise above 24° C. Additionally, valve 346 may be required to remain open for a predetermined period of time (e.g., 1 minute, 5 minutes, etc.) to mitigate potential piping issues (e.g., water hammer). Equipment allocator 460 may determine that valve 346 must allow and restrict cold fluid within an interval lower than the predetermined period of time. As this is outside of the operational parameters required by hysteresis, equipment allocator 460 445 removes valve 346 from schematic representation and updates the incidence matrix accordingly.

In some embodiments, removal of a device may be performed when a device is inoperable. For example, pump 234 has incurred a mechanical issue (e.g., water sediment buildup, broken pump vanes, cracked rotor, etc.). This may render pump 234 inoperable for pumping chilled fluid to chiller 232. Accordingly, equipment allocator 460 removes pump 234 from the incidence matrix representation. In some embodiments, removal of a device may be performed when a device in providing unreliable outputs. For example, pump 232 may be providing volatile measurements that increase and decrease significantly in substantially short periods of time. In such an embodiment, equipment allocator 460 may remove pump 234 from schematic representation and updates the incidence matrix accordingly.

In some embodiments, removal of a device may be performed when an external device receives measurements that are indicative or abnormal operating conditions. For example, an outdoor air temperature (OAT) sensor may receive temperature measurements that are significantly higher that standard operating temperatures (e.g., 43° C.). In such an embodiment, equipment allocator 460 may determine that various devices (e.g., chiller C1) may generate too much power consumption to be operable during optimization processes. Equipment allocator 460 may then remove chiller C1 from schematic representation and update the incidence matrix accordingly.

In some embodiments, removal of a device may be performed based on various uncontrollable external variables (e.g., season changes, extreme weather conditions, etc.). For example, building 10 may be located in an environment in which a severe ice storm occurs. Temperatures may drop below −26° C. and render HVAC devices and/or external devices (e.g., OAT sensors) inoperable. In such an embodiment, equipment allocator 460 may determine that the various devices are not in a condition to operate. This may be due to too high of power consumption to operate under normal operating parameters, mechanical issues due to temperature, and various other device-related issues. Equipment allocator 460 may then remove chiller C1 from schematic representation and update the incidence matrix accordingly. In some embodiments, measurements received from OAT sensors may lead equipment allocator 460 to remove entire groups/subplants from schematic representation and update the incidence matrix accordingly. In various embodiments, external factors are not limited to temperature and can include other factors such as sediment buildup in pipes, flooding, and/or mechanical issues with the devices.

In some embodiments, removal of a device may be performed based on changes in required load that cause devices to be turned on/off based on operating sequences. For example, equipment allocator 460 may determine that, of various chillers A-F within HVAC system 100, chillers A-F generate chilled fluid in a non-linear relationship with respect to power consumption. In the exemplified embodiment, the chillers A-F consume less power when operating a low capacity (e.g., chilling fluid at 25% total load capacity for the chillers) and consume more power when operating at a high capacity (e.g., chilling fluid at 85% total load capacity for the chillers). Accordingly, asset allocator 460 may determine that it is optimal in terms of power consumption to operate all chillers A-F at a lower capacity rather than some chillers at a higher capacity. For example, if equipment allocator 460 determines that 120 units of chilled fluid must be generated, equipment allocator 460 may determine that controlling chillers A-F to generate 20 units of chilled fluid each is more optimal than controlling chillers A-B to generate 60 units of chilled fluid each. However if asset allocator did determine that controlling chillers A-B to generate 60 units of chilled fluid each was more optimal, equipment allocator 460 may then remove chillers C-F from schematic representation and update the incidence matrix accordingly, as they would no longer be implemented in the optimization process.

Process 1200 is shown to include implementing a stranded node analysis (step 1206). Step 1206 may be substantially similar to step 1204. Process 1200 may be configured to implement a stranded node analysis at any point during optimization, include after stage one, after stage two, or both. As shown in FIG. 12, step 1206 is performed after stage two and may implement stranded node analysis with regards to HVAC devices rather than other higher-level schematic representations (e.g., subplants).

Process 1200 is shown to include updating the high level optimizer with operating parameter data or power estimation data (step 1210). In some embodiments, equipment allocator 460 may provide high level optimizer 440 with various information that was retrieved during various stages of low level optimization. For example, power estimator 480 as shown in FIG. 4 may provide power estimation data back to equipment allocator 460. Data regarding power estimation and operational parameters regarding various HVAC devices may be provided to high level optimizer 440.

Figure 13A:
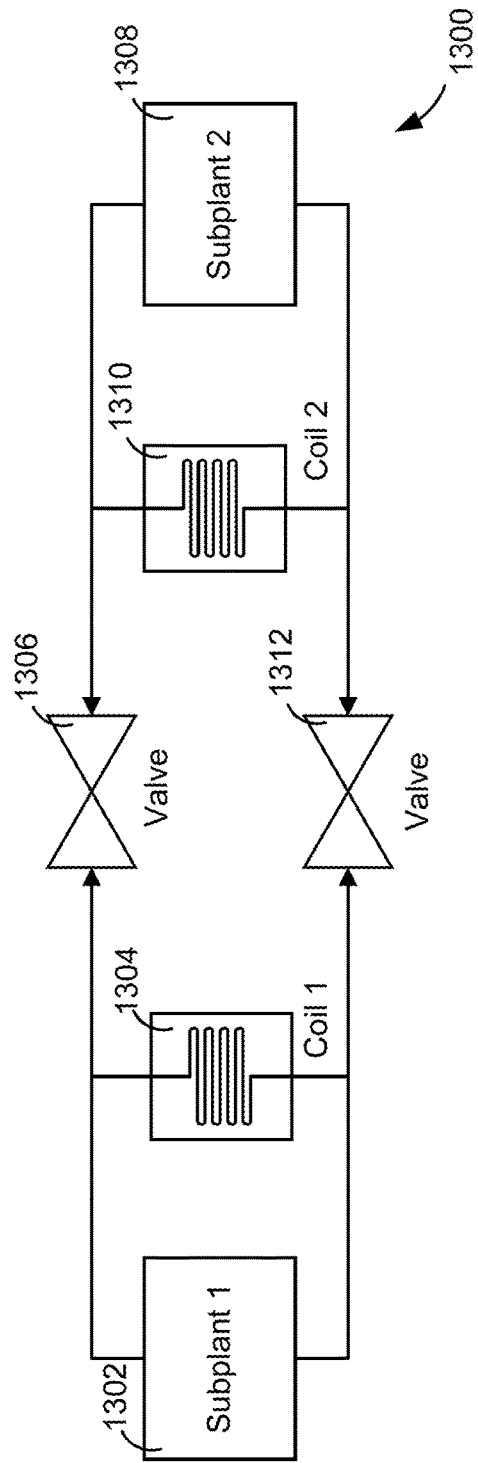
FIG. 13A is a block diagram of an HVAC system, according to some embodiments.
Figure 13B:
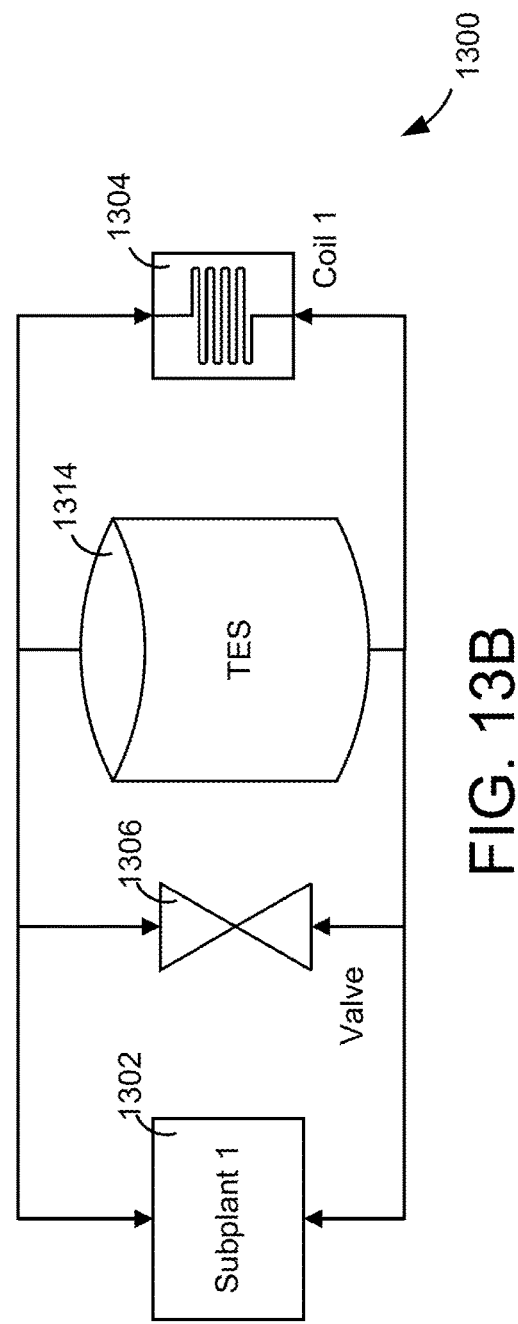
FIG. 13B is a block diagram of an HVAC system, according to some embodiments.

Referring now to FIGS. 13A-B, various embodiments of schematic representations of subplants within HVAC system 100 are shown, according to exemplary embodiments. Referring particularly to FIG. 13A, a first exemplary embodiment of system 1300 is shown. System 1300 is shown to include first subplant 1302, first coil 1304, valve 1306, 1312, second coil 1310, second subplant 1308. The various coils and valves as shown in FIG. 13A may be identical or substantially similar to the coils and valves disclosed with reference to FIGS. 2-3. First subplant 1302 and second subplant 1308 may be similar to heat recover chiller subplant 204, chiller subplant 206, heater subplant 202, or any other subplant within HVAC system 100 disclosed herein.

In some embodiments, system 1300 is configured to alter certain parameters based on decisions provided by high level optimizer 440. For example, high level optimizer 440 may determine not to use first subplant 1302 during optimization. Equipment allocator 460 may then remove first subplant 1302 from the schematic representation generated by equipment allocator 460. Equipment allocator 460 may then update an incidence matrix accordingly. This is may result in valves 1306,1312 receiving control signals to remain closed, as equipment allocator 460 will be restricted from providing fluid to first supplant 1302 and first coil 1304.

In some embodiments, high level optimizer 440 may determine to use first subplant 1302 during certain periods during optimization, but not during other periods. In such an embodiment, first subplant 1302 would remain in the incidence matrix representation while valves 1306, 1312 receiving control signals corresponding to the decisions processed by equipment allocator 460. For example, asset allocator 445 may determine that first subplant 1302 must engage in operation during time period A. Before time period A, valves 1306, 1312 remain closed and restrict fluid from entering first subplant 1302 or first coil 1304. During time period A, valves 1306, 1312 receive control signals to open and allow first subplant 1302 and first coil 1304 to engage in operation. In some embodiments, these decisions are performed by asset allocator 445, equipment allocator 460, or a combination of both.

Referring particularly to FIG. 13B, a second exemplary embodiment of system 1300 is shown. System 1300, as shown in FIG. 13B, is shown to include first subplant 1302, coil 1304, valve 1306, and thermal energy storage (TES) 1314. TES may be identical or substantially similar to any thermal energy storage component disclosed herein (e.g., hot TES 242, cold TES 244, etc.). In some embodiments, system 1300 is configured to alter certain parameters based on decisions provided by high level optimizer 440.

For example, asset allocator 440 determines that TES 1314 requires an increase in energy storage (e.g., an increase in stored chilled fluid). Equipment allocator 460 may then close valve 1306 to restrict fluid from bypassing TES 1314 and forcing fluid to enter TES 1314. In some embodiments, first coil 1304 is further restricted from receiving fluid so all fluid must enter TES 1314. In various embodiments, the various control decisions are made by asset allocator 445, equipment allocator 460, or a combination of both. In some embodiments, TES may receive control signals to discharge stored thermal energy. During discharge, equipment allocator 460 may provide a control signal to valve 1306 to remain closed during discharging.

Figure 14:
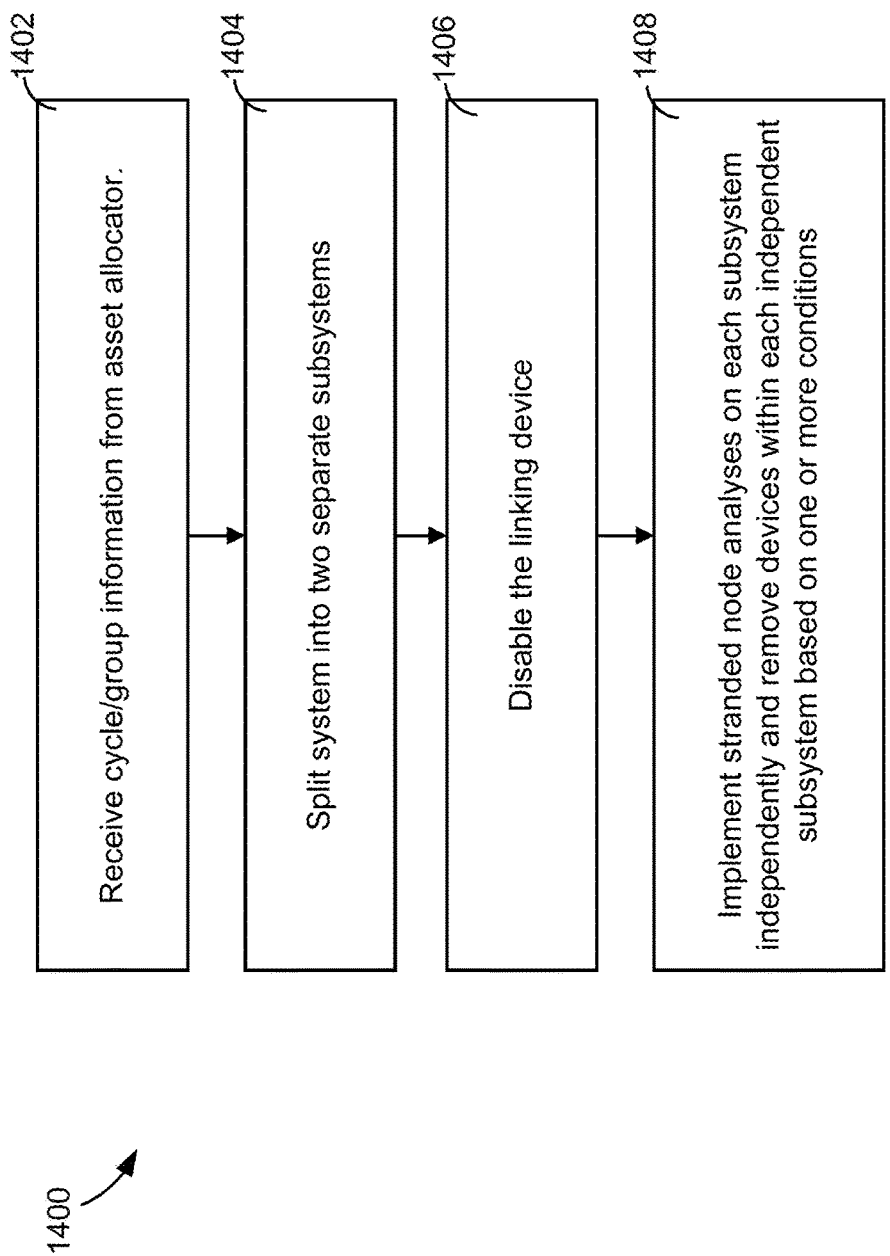
FIG. 14 is a process for optimizing an HVAC system, which can be implemented by the controller of FIG. 4, according to some embodiments.

Referring now to FIG. 14, a process 1400 for optimizing an HVAC system is shown, according to some embodiments. Process 1400 may be implemented by asset allocator 440. In some embodiments, process 1400 may implemented by a combination of processing components within central plant controller. For example, process 1400 may implemented by a combination of asset allocator 445 and equipment allocator 460.

Process 1400 is shown to include receiving cycle/group information from asset allocator (step 1402). In some embodiments, asset allocator 445, equipment allocator 460, or a combination of both may provide group/cycle data via group generator 560 as shown above with reference to FIG. 5A. In various embodiments, asset allocator 460 may decide to exclude one or more subplants from HVAC system 100 and remove the excluded subplant from an incident matrix representation. This may prevent control equipment within low level optimizer 450 from providing control signals to the various equipment within the excluded subplant. In other embodiments, asset allocator 460 may choose to include a subplant periodically and exclude a subplant periodically. This may result in the actuation of one or more valves within HVAC system 100 that can include or isolate a particular subsystem based on instructions from asset allocator 460.

Process 1400 is shown to include splitting the system into two separate subsystems (step 1404). In some embodiments, step 1404 includes splitting up an HVAC system into two or more distinct subsystems for purposes of decreasing latency during optimization and increasing efficiency. For example, asset allocator 445 may decide to split system 1300 into two distinct subsystems, with a first subsystem on the left side of valves 1306, 1312 (i.e., first subplant 1302 and first coil 1304) and the second subsystem on the right side of valves 1306, 1312 (i.e., second subplant 1308 and second coil 1310).

Process 1400 is shown to include disabling the linking device (step 1406). In some embodiments, a linking device (e.g., valve, damper, etc.) may be located between two split subsystems such that opening of the linking device may allow the subsystems to connect. Step 1406 may include disabling (e.g., closing) valves 1306, 1312 to create two independent subsystems within system 1300, as shown in FIG. 13A. In some embodiments, only a single valve connects two split subsystems. In other embodiments, more than two valves can be used to connect two split subsystems.

Process 1400 is shown to include implementing stranded node analyses on each subsystem independently and remove devices within each independent subsystem based on one or more conditions (step 1408). After the linking device (e.g., valves 1306, 1312) have been disabled, system 1300 may now be analyzed as two distinct subsystems to asset allocator 445. Implementation of a stranded node analysis may be identical or similar to that of the stranded node analysis as described with reference to FIG. 12. In some embodiments, implementation of the stranded node analysis in each subsystem by asset allocator 445 may be performed on a device-by-device basis. For example, asset allocator 445 may implement stranded node analysis as shown with reference to FIGS. 7A-8C and remove HVAC devices rather than other higher-level schematic representations (e.g., removing subplants).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a plurality of heating, ventilation, or air conditioning (HVAC) devices, the controller comprising:
a processing circuit comprising one or more processors and memory storing instructions that, when executed by the one or more processors, cause the one or more processors to:
detect a change in condition that affects an operating status of a first HVAC device of the plurality of HVAC devices, the first HVAC device operable to produce, consume, store, or direct flow of one or more fluid resources or energy resources;
use schematic relationships between the plurality of HVAC devices and the operating status of the first HVAC device to determine a reduced subset of the plurality of HVAC devices for which operating parameters are to be generated, the schematic relationships indicating fluid connections or energy connections between the plurality of HVAC devices through which the one or more fluid resources or energy resources are transferred between the plurality of HVAC devices;
generate the operating parameters for the reduced subset of the plurality of HVAC devices; and
operate the reduced subset of the plurality of HVAC devices using the operating parameters.

2. The controller of claim 1, wherein using the schematic relationships between the plurality of HVAC devices to determine the reduced subset of the plurality of HVAC devices comprises:
identifying a second HVAC device of the plurality of HVAC devices that is schematically dependent on the first HVAC device based on the schematic relationships; and
excluding the second HVAC device from the reduced subset of the plurality of HVAC devices.

3. The controller of claim 1, wherein using the schematic relationships between the plurality of HVAC devices to determine the reduced subset of the plurality of HVAC devices comprises:
identifying a second HVAC device of the plurality of HVAC devices that is arranged in series with the first HVAC device based on the schematic relationships; and
excluding the second HVAC device from the reduced subset of the plurality of HVAC devices in response to the change in condition causing the first HVAC device to become inactive.

4. The controller of claim 1, wherein using the schematic relationships between the plurality of HVAC devices to determine the reduced subset of the plurality of HVAC devices comprises:
identifying a second HVAC device of the plurality of HVAC devices that is arranged in parallel with the first HVAC device based on the schematic relationships; and
setting an operating status of the second HVAC device to provide a flow path for at least one of the one or more fluid resources or energy resources through the second HVAC device in response to the change in condition causing a flow path for the at least one of the one or more fluid resources or energy resources through the first HVAC device to become closed.

5. The controller of claim 1, wherein using the schematic relationships between the plurality of HVAC devices to determine the reduced subset of the plurality of HVAC devices comprises:
determining that the first HVAC device is a linking device that couples a first group of the plurality of HVAC devices with a second group of the plurality of HVAC devices based on the schematic relationships; and
excluding the second group of the plurality of HVAC devices from the reduced subset of the plurality of HVAC devices in response to the change in condition causing the first HVAC device to decouple the first group from the second group.

6. The controller of claim 1, wherein using the schematic relationships between the plurality of HVAC devices to determine the reduced subset of the plurality of HVAC devices comprises:
identifying a stranded node coupled to the first HVAC device in response to the change in condition causing the operating status of the first HVAC device to become inactive;
using the schematic relationships to identify a second HVAC device of the plurality of HVAC devices coupled to the stranded node; and
excluding the second HVAC device from the reduced subset of the plurality of HVAC devices.

7. A controller for a plurality of heating, ventilation, or air conditioning (HVAC) devices, the controller comprising:
a processing circuit comprising one or more processors and memory storing instructions that, when executed by the one or more processors, cause the one or more processors to:
detect a change in condition that affects an operating status of a first HVAC device of the plurality of HVAC devices, the first HVAC device operable to produce, consume, store, or direct flow of one or more fluid resources or energy resources;
determine, using the operating status of the first HVAC device and schematic relationships indicating fluid connections or energy connections between the plurality of HVAC device through which the one or more fluid resources or energy resources are transferred between the plurality of HVAC devices, a reduced subset of the plurality of HVAC devices for which operating parameters are to be generated based on the change in condition;
generate the operating parameters for the reduced subset of the plurality of HVAC devices while skipping computations associated with a remainder of the plurality of HVAC devices; and
operate the reduced subset of the plurality of HVAC devices using the operating parameters.

8. The controller of claim 7, wherein:
the change in condition is a change in a monitored variable that causes the operating status of the first HVAC device to become inactive; and
determining the reduced subset of the plurality of HVAC devices comprises excluding the first HVAC device from the reduced subset of the plurality of HVAC devices.

9. The controller of claim 7, wherein determining the reduced subset of the plurality of HVAC devices for which operating parameters are to be generated comprises:
using a stored rule to evaluate the change in condition and set the operating status of the first HVAC device to an operating status defined by the stored rule;
excluding the first HVAC device from the reduced subset of the plurality of HVAC devices in response to setting the operating status of the first HVAC device to the operating status defined by the stored rule.

10. The controller of claim 7, wherein:
the change in condition is an indication that a sensor is offline or that measurements from the sensor are unreliable; and
determining the reduced subset of the plurality of HVAC devices comprises disabling the first HVAC device and excluding the first HVAC device from the reduced subset of the plurality of HVAC devices in response to determining that operating the first HVAC device relies upon the measurements from the sensor.

11. The controller of claim 7, wherein:
detecting the change in condition comprises determining a time at which the operating status of the first HVAC device most recently changed; and
determining the reduced subset of the plurality of HVAC devices comprises excluding the first HVAC device from the reduced subset of the plurality of HVAC devices in response to determining that a threshold amount of time has not yet elapsed since the time at which the operating status of the first HVAC device most recently changed.

12. The controller of claim 7, wherein determining the reduced subset of the plurality of HVAC devices comprises:
using the schematic relationships between the plurality of HVAC devices to identify a second HVAC device that is schematically dependent on the first HVAC device; and
excluding the second HVAC device from the reduced subset of the plurality of HVAC devices.

13. The controller of claim 7, wherein determining the reduced subset of the plurality of HVAC devices comprises:
identifying a stranded node coupled to the first HVAC device in response to the change in condition causing the operating status of the first HVAC device to become inactive;
using the schematic relationships between the plurality of HVAC devices to identify a second HVAC device of the plurality of HVAC devices coupled to the stranded node; and
excluding the second HVAC device from the reduced subset of the plurality of HVAC devices.

14. A method for operating a plurality of heating, ventilation, or air conditioning (HVAC) devices, the method comprising:
detecting a change in condition that affects an operating status of a first HVAC device of the plurality of HVAC devices, the first HVAC device operable to produce, consume, store, or direct flow of one or more fluid resources or energy resources;
using the operating status of the first HVAC device and schematic relationships between the plurality of HVAC devices to determine a reduced subset of the plurality of HVAC devices for which operating parameters are to be generated, the schematic relationships indicating fluid connections or energy connections between the plurality of HVAC devices through which the one or more fluid resources or energy resources are transferred between the plurality of HVAC devices;
generating operating parameters for the reduced subset of the plurality of HVAC devices; and
operating the reduced subset of the plurality of HVAC devices using the operating parameters.

15. The method of claim 14, wherein using the schematic relationships between the plurality of HVAC devices to determine the reduced subset of the plurality of HVAC devices comprises:
identifying a second HVAC device of the plurality of HVAC devices that is schematically dependent on the first HVAC device based on the schematic relationships; and
excluding the second HVAC device from the reduced subset of the plurality of HVAC devices.

16. The method of claim 14, wherein using the schematic relationships between the plurality of HVAC devices to determine the reduced subset of the plurality of HVAC devices comprises:
identifying a second HVAC device of the plurality of HVAC devices that is arranged in series with the first HVAC device based on the schematic relationships; and
excluding the second HVAC device from the reduced subset of the plurality of HVAC devices in response to the change in condition causing the first HVAC device to become inactive.

17. The method of claim 14, wherein using the schematic relationships between the plurality of HVAC devices to determine the reduced subset of the plurality of HVAC devices comprises:
identifying a second HVAC device of the plurality of HVAC devices that is arranged in parallel with the first HVAC device based on the schematic relationships; and
setting an operating status of the second HVAC device to provide a flow path for at least one of the one or more fluid resources or energy resources through the second HVAC device in response to the change in condition causing a flow path for the at least one of the one or more fluid resources or energy resources through the first HVAC device to become closed.

18. The method of claim 14, wherein using the schematic relationships between the plurality of HVAC devices to determine the reduced subset of the plurality of HVAC devices comprises:
determining that the first HVAC device is a linking device that couples a first group of the plurality of HVAC devices with a second group of the plurality of HVAC devices based on the schematic relationships; and excluding the second group of the plurality of HVAC devices from the reduced subset of the plurality of HVAC devices in response to the change in condition causing the first HVAC device to decouple the first group from the second group.

19. The method of claim 14, wherein using the schematic relationships between the plurality of HVAC devices to determine the reduced subset of the plurality of HVAC devices comprises:
  identifying a stranded node coupled to the first HVAC device in response to the change in condition causing the operating status of the first HVAC device to become inactive;
  using the schematic relationships to identify a second HVAC device of the plurality of HVAC devices coupled to the stranded node; and
  excluding the second HVAC device from the reduced subset of the plurality of HVAC devices.

20. The method of claim 14, wherein:
  the change in condition is a change in a monitored variable that causes the operating status of the first HVAC device to become inactive; and
  determining the reduced subset of the plurality of HVAC devices comprises excluding the first HVAC device from the reduced subset of the plurality of HVAC devices.

* * * * *